US012576638B2

(12) United States Patent
Naganuma et al.

(10) Patent No.: US 12,576,638 B2

(45) Date of Patent: Mar. 17, 2026

(54) LIQUID EJECTING HEAD

(71) Applicant: SEIKO EPSON CORPORATION, Tokyo (JP)

(72) Inventors: Yoichi Naganuma, Matsumoto (JP); Shohei Mizuta, Matsumoto (JP); Yuki Watanabe, Matsumoto (JP); Madoka Goi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 18/622,222

(22) Filed: Mar. 29, 2024

(65) Prior Publication Data

US 2024/0326420 A1 Oct. 3, 2024

(30) Foreign Application Priority Data

Mar. 31, 2023 (JP) ................................ 2023-057556

(51) Int. Cl.
*B41J 2/14* (2006.01)

(52) U.S. Cl.
CPC ......... *B41J 2/1404* (2013.01); *B41J 2/14233* (2013.01)

(58) Field of Classification Search
CPC ...... B41J 2/1404; B41J 2/14233; B41J 2/161; B41J 2/1623; B41J 2/1626; B41J 2002/14241; B41J 2002/14419; B41J 2002/14491; B41J 2202/11; B41J 2/14201
See application file for complete search history.

(56) References Cited

U.S. PATENT DOCUMENTS

2015/0022593 A1 1/2015 Fukuda
2020/0247125 A1 * 8/2020 Mizuno ...................... B41J 2/18

FOREIGN PATENT DOCUMENTS

JP 2018-065391 A 4/2018

* cited by examiner

*Primary Examiner* — Lisa Solomon
(74) *Attorney, Agent, or Firm* — WORKMAN NYDEGGER

(57) ABSTRACT

A liquid ejecting head has a piezoelectric element, a diaphragm, and a pressure chamber substrate having a pressure chamber coupled to a nozzle and contributing to ejection of a liquid by applying pressure on the liquid through vibration of the diaphragm and a dummy pressure chamber not contributing to ejection of the liquid. Each of the pressure chamber and the dummy pressure chamber opens on a surface opposite to a surface facing the diaphragm of the pressure chamber substrate, and is a recess having a depth in a direction toward the diaphragm along the lamination direction. Furthermore, the pressure chamber and the dummy pressure chamber are arranged in an arrangement direction perpendicular to the lamination direction, and a first depth as the depth of the dummy pressure chamber is shallower than a second depth as the depth of the pressure chamber.

12 Claims, 11 Drawing Sheets

FIG. 11

LIQUID EJECTING HEAD

The present application is based on, and claims priority from JP Application Serial Number 2023-057556, filed Mar. 31, 2023, the disclosure of which is hereby incorporated by reference herein in its entirety.

BACKGROUND

1. Technical Field

The present disclosure relates to a liquid ejecting head.

2. Related Art

As described in JP-A-2018-65391, in some liquid ejecting heads, a dummy pressure chamber is provided adjacent to a plurality of arranged pressure chambers. The dummy pressure chamber is a technology for reducing variation in pressure loss among pressure chambers provided in different locations. Variation in pressure loss among pressure chambers causes a difference in the amount and flight speed of the ejected liquid. A plurality of pressure chambers is affected by pressure fluctuation in an adjacent pressure chamber. For this reason, among the plurality of pressure chambers, there is a difference in pressure loss between a pressure chamber at an end portion and a pressure chamber at the center due to the presence or absence of an adjacent pressure chamber. Hence, a dummy pressure chamber is provided adjacent to the pressure chamber at the end portion to reduce the difference between the pressure loss in the end portion pressure chamber and the pressure loss in the center pressure chamber.

However, as described in JP-A-2018-65391, it is known that simply providing a dummy pressure chambers is not sufficient to curb the variation in pressure loss among the pressure chambers. In the dummy pressure chamber, to avoid pressure fluctuation, no tension is applied to the diaphragm or partition wall of the dummy pressure chamber. Hence, a pressure chamber adjacent to a dummy pressure chamber has a greater degree of deformation of the diaphragm and partition wall than a pressure chamber adjacent to a non-dummy pressure chamber. Accordingly, there is a variation in pressure loss in the pressure chamber between the end portion pressure chamber adjacent to the dummy pressure chamber and the center pressure chamber not adjacent to the dummy pressure chamber.

In the technology of JP-A-2018-65391, a piezoelectric element is provided in a dummy pressure chamber as well, and the piezoelectric element of the dummy pressure chamber is also driven during liquid ejection by a liquid ejecting head, so that pressure fluctuation occurs in the dummy pressure chamber. Hence, in the technology of JP-A-2018-65391, variation in pressure loss among the pressure chambers is curbed by causing tension in the diaphragm and partition wall of the dummy pressure chamber.

However, when providing a piezoelectric element in the dummy pressure chamber as well and driving the dummy pressure chamber, wiring and control circuits become complex in the liquid ejecting head. Moreover, the liquid ejecting head consumes a large amount of energy to drive the piezoelectric element of the dummy pressure chamber.

Variation in pressure loss also deteriorates liquid ejection characteristics. This causes a difference in concentration of the ejected liquid, which may result in unevenness in the liquid attached to the ejection target. Accordingly, there has been a need for a technology that can curb variation in pressure loss among pressure chambers without driving a piezoelectric element of a dummy pressure chamber.

SUMMARY

According to an aspect of the present disclosure, a liquid ejecting head is provided. The liquid ejecting head includes: a piezoelectric element; a diaphragm that vibrates by being driven by the piezoelectric element; a pressure chamber coupled to a nozzle and contributing to ejection of a liquid by applying pressure on the liquid through vibration of the diaphragm; and a pressure chamber substrate that has a pressure chamber coupled to a nozzle and contributing to ejection of a liquid by applying pressure on the liquid through vibration of the diaphragm, and a dummy pressure chamber not contributing to ejection of the liquid are laminated in a lamination direction. The pressure chamber substrate, the diaphragm and the piezoelectric element are laminated in this order in a lamination direction. Each of the pressure chamber and the dummy pressure chamber opens on a surface opposite to a surface facing the diaphragm of the pressure chamber substrate, and is a recess having a depth in a direction toward the diaphragm along the lamination direction. The pressure chamber and the dummy pressure chamber are arranged in an arrangement direction perpendicular to the lamination direction. A first depth as the depth of the dummy pressure chamber is shallower than a second depth as the depth of the pressure chamber.

DESCRIPTION OF EMBODIMENTS

A. First Embodiment

A1. Overall Configuration of Liquid Ejecting Apparatus

Figure 1:
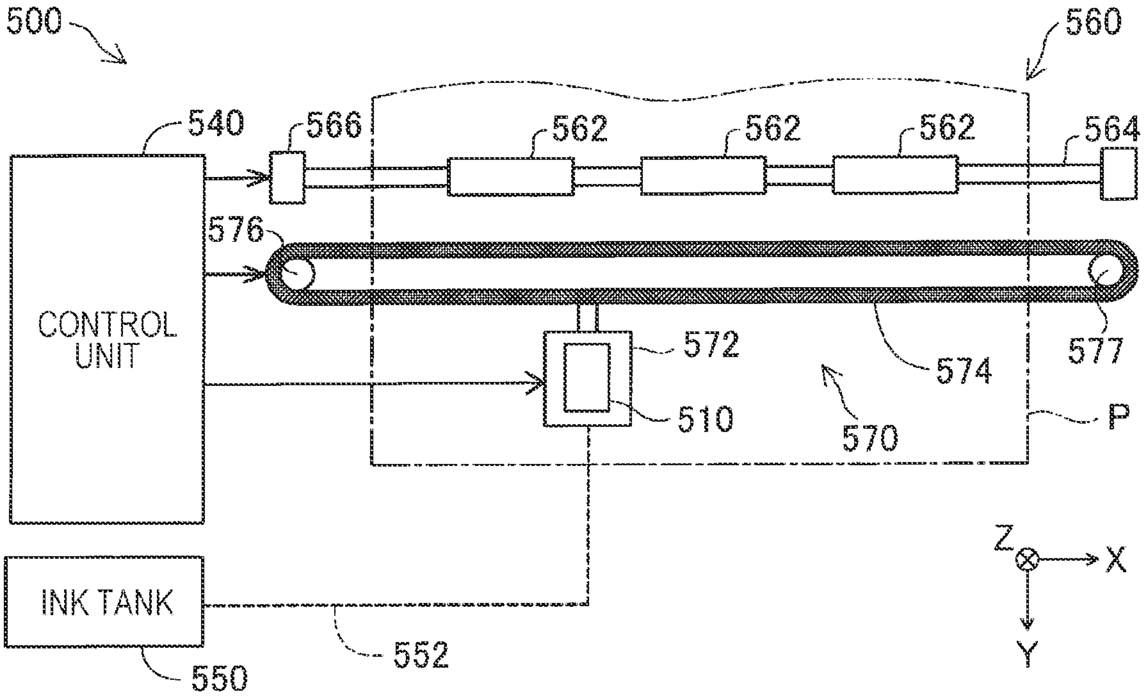
FIG. 1 is a block diagram illustrating a schematic configuration of a liquid ejecting apparatus.

FIG. 1 is a block diagram illustrating a schematic configuration of a liquid ejecting apparatus 500 including a liquid ejecting head 510 as a first embodiment of the present disclosure. In the present embodiment, the liquid ejecting apparatus 500 is configured as an ink jet printer and forms an image by ejecting ink onto a printing paper P. FIG. 1 shows three mutually orthogonal axes which are an X axis, a Y axis, and a Z axis. The X axis, Y axis, and Z axis in other drawings all correspond to the X axis, Y axis, and Z axis in FIG. 1. When specifying the orientation, positive and negative signs are used together in the directional notation, with "+" for a positive direction and "−" for a negative direction.

The liquid ejecting apparatus 500 includes the liquid ejecting head 510, an ink tank 550, a transport mechanism 560, a movement mechanism 570, and a control unit 540.

The liquid ejecting head 510 has many nozzles 21 and ejects ink in the +Z direction to form an image on the printing paper P. The configuration of the liquid ejecting head 510 will be described in detail later. For example, a total of four ink colors which are black, cyan, magenta, and yellow are used as the inks to be ejected. Note that the liquid ejecting head 510 is mounted on a later-described carriage 572 provided in the movement mechanism 570, and moves back and forth in the fast scan direction as the carriage 572 moves. In the present embodiment, the fast scan directions are the +X direction and the −X direction. The +X direction and the −X direction are also referred to as an "X-axis direction."

The ink tank 550 stores ink to be ejected from the liquid ejecting head 510. The ink tank 550 is not mounted on the carriage 572. The ink tank 550 and the liquid ejecting head 510 are coupled by a resin tube 552, and ink is supplied from the ink tank 550 to the liquid ejecting head 510 via the tube 552.

The transport mechanism 560 transports the printing paper P in the slow scan direction. The slow scan direction is orthogonal to the X-axis direction, which is the fast scan direction, and in the present embodiment, the slow scan direction is the +Y direction and the −Y direction. The +Y direction and the −Y direction are also referred to as a "Y-axis direction." The transport mechanism 560 includes a transport rod 564 to which three transport rollers 562 are attached and a transport motor 566 that rotates and drives the transport rod 564. When the transport motor 566 rotates and drives the transport rod 564, a plurality of transport rollers 562 rotates to transport the printing paper P in the +Y direction which is the slow scan direction.

The movement mechanism 570 includes, in addition to the carriage 572 mentioned earlier, a transport belt 574, a movement motor 576, and a pulley 577. The liquid ejecting head 510 is mounted on the carriage 572 in an ink ejection-ready state. The carriage 572 is attached to the transport belt 574. The transport belt 574 is wound between the movement motor 576 and the pulley 577. The rotation of the movement motor 576 causes the transport belt 574 to move back and forth in the fast scan direction. This causes the carriage 572 attached to the transport belt 574 to also move back and forth in the fast scan direction.

The control unit 540 controls the entire liquid ejecting apparatus 500. For example, the control unit 540 controls the reciprocating motion of the carriage 572 along the fast scan direction and the transport motion of the printing paper P along the slow scan direction. In the present embodiment, the control unit 540 also functions as a drive controller of a piezoelectric actuator described below. That is, the control unit 540 outputs a drive signal to the liquid ejecting head 510 to drive the piezoelectric actuator, thereby controlling ink ejection onto the printing paper P.

A2. Detailed Configuration of Liquid Ejecting Head

Figure 2:
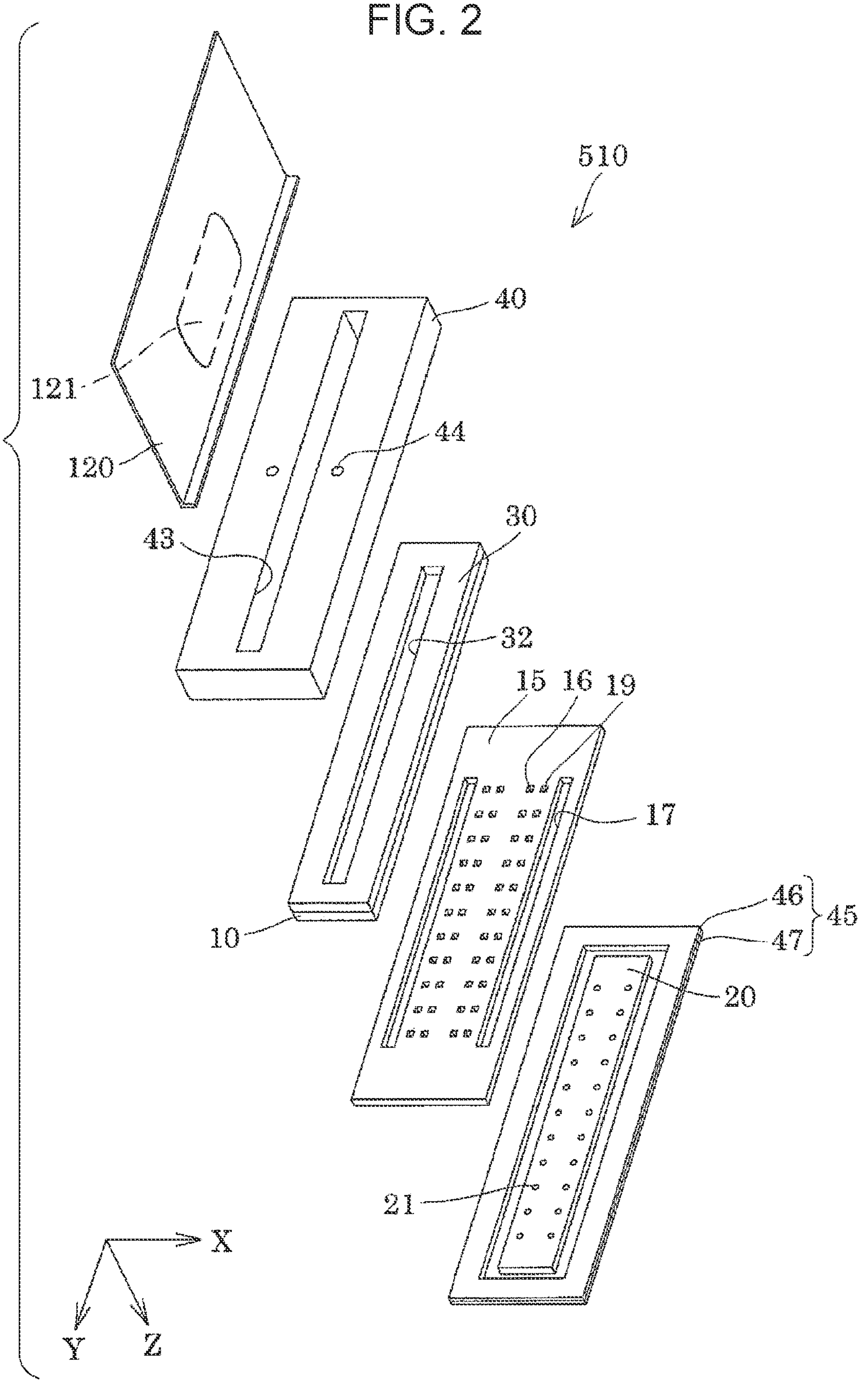
FIG. 2 is an exploded perspective view of the configuration of a liquid ejecting head.
Figure 3:
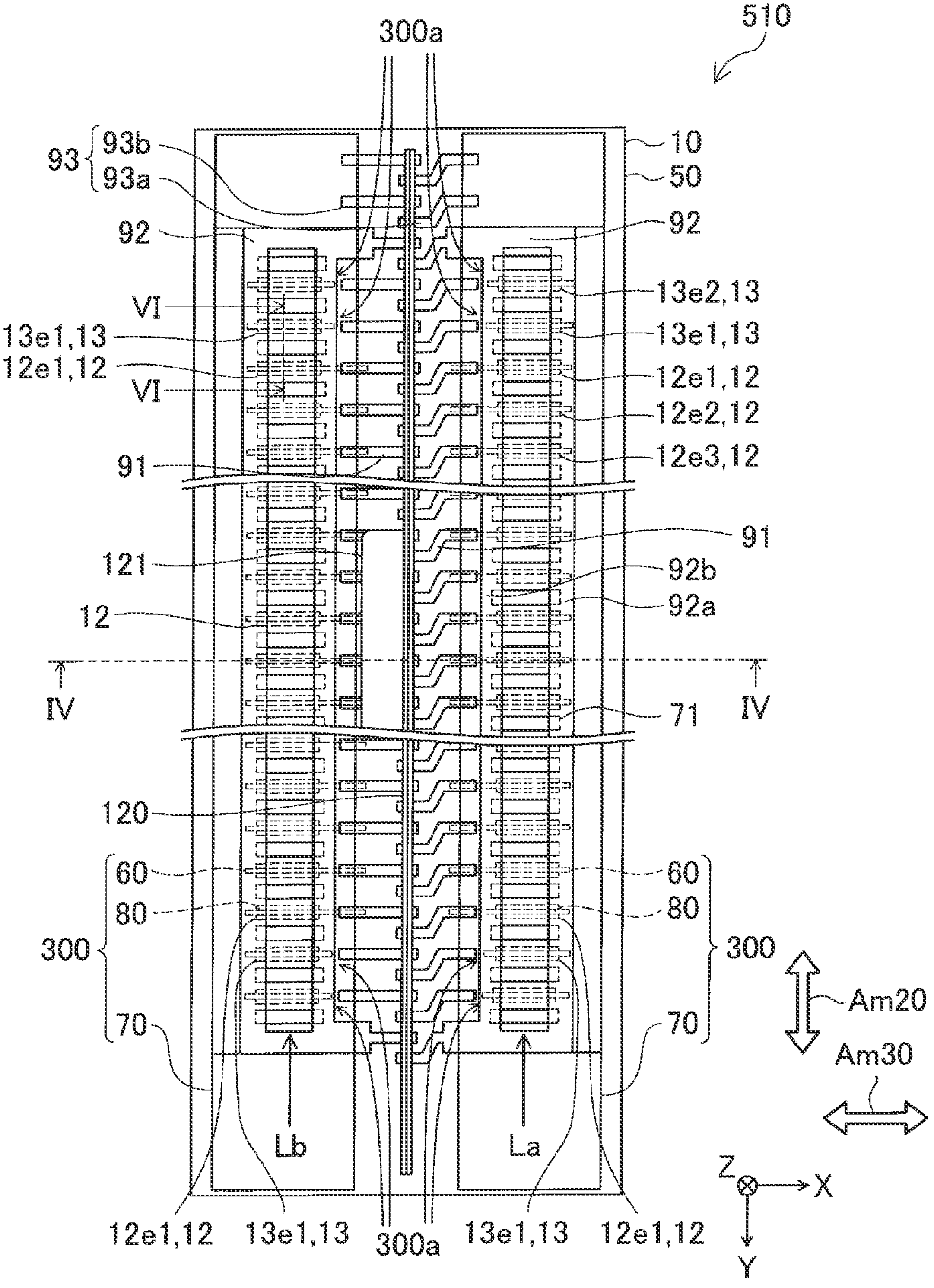
FIG. 3 is an explanatory drawing of the configuration of the liquid ejecting head in plan view.
Figure 4:
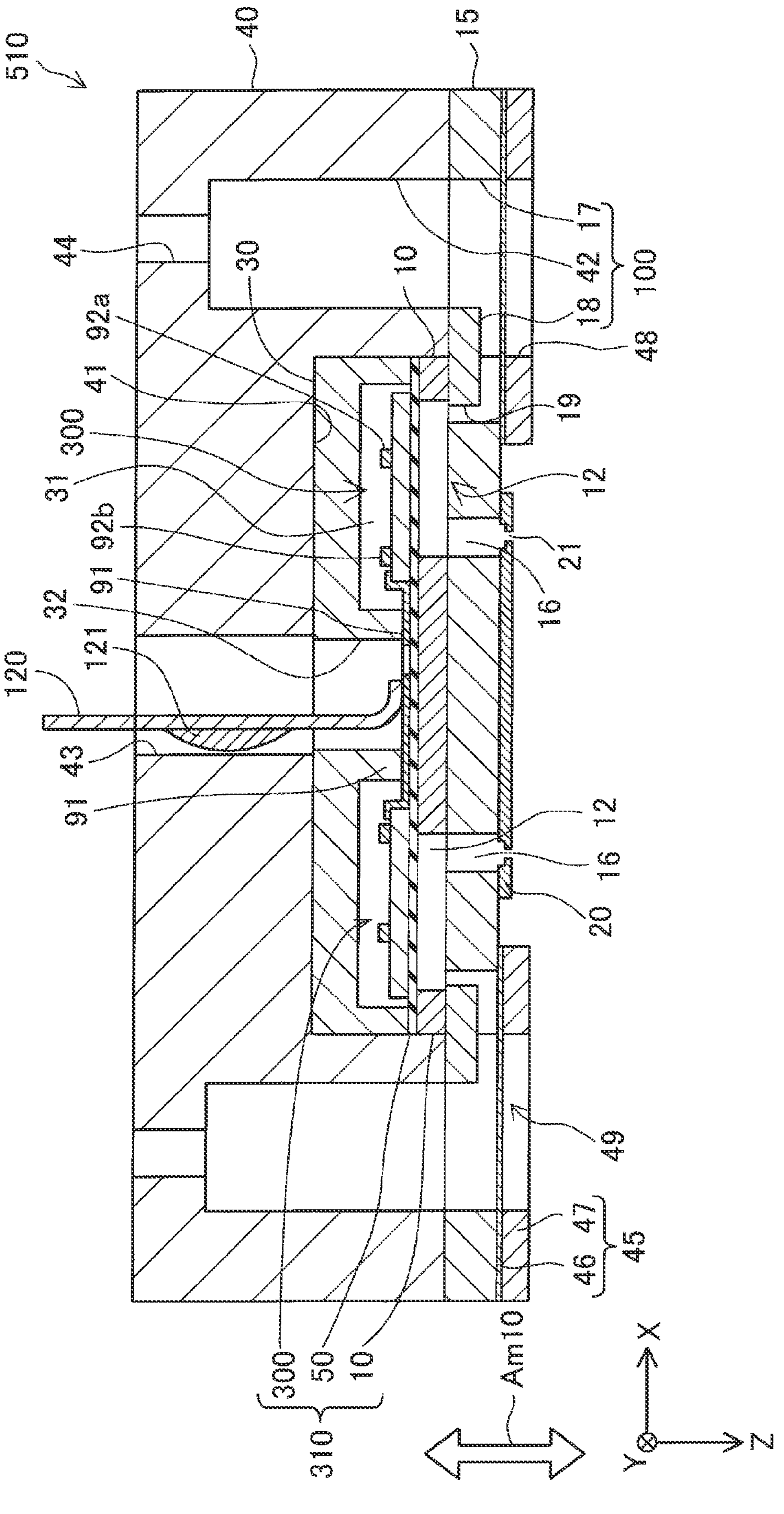
FIG. 4 is a cross-sectional view showing the IV-IV position of FIG. 3.

FIG. 2 is an exploded perspective view of the configuration of the liquid ejecting head 510. FIG. 3 is an explanatory drawing of the configuration of the liquid ejecting head 510 in plan view. FIG. 3 illustrates the configuration around a pressure chamber substrate 10 in the liquid ejecting head 510. In FIG. 3, a protective substrate 30 and a case member 40 are omitted to facilitate understanding of the technology. FIG. 4 is a cross-sectional view showing the IV-IV position of FIG. 3.

The liquid ejecting head 510 more specifically has the pressure chamber substrate 10, a coupling plate 15, a nozzle plate 20, a compliance substrate 45, the protective substrate 30, the case member 40, and a relay substrate 120, as illustrated in FIG. 2, and also a piezoelectric element 300 and a dummy piezoelectric element **300*a* illustrated in FIG. 3, and a diaphragm 50 illustrated in FIG. 4. The pressure chamber substrate 10, the coupling plate 15, the nozzle plate 20, the compliance substrate 45, the diaphragm 50, the piezoelectric element 300 or dummy piezoelectric element 300*a*, the protective substrate 30, and the case member 40 are laminated components, which when laminated form the liquid ejecting head 510. In the present disclosure, the direction in which the laminated members forming the liquid ejecting head 510 are laminated is also referred to as a lamination direction Am10. The −Z direction and the +Z direction are also referred to as a "Z-axis direction." The lamination direction Am10** is also a direction along the Z-axis direction.

The pressure chamber substrate 10 is formed using, for example, silicon crystals. As illustrated in FIG. 3, the pressure chamber substrate 10 has a plurality of pressure chambers 12 and one or more dummy pressure chambers 13 arranged in an arrangement direction Am20 perpendicular to the lamination direction Am10. The direction in which the plurality of pressure chambers 12 and the one or more dummy pressure chambers 13 are arranged is also referred to as the arrangement direction Am20. The +Y direction and the −Y direction are also referred to as a "Y-axis direction." The arrangement direction Am20 is also a direction along the Y-axis direction. The pressure chamber 12 and the dummy pressure chamber 13 have a rectangular shape in which the length in the X-axis direction is longer than the length in the Y-axis direction in plan view.

Each of the plurality of pressure chambers 12 and each of the one or more dummy pressure chambers 13 is a recess having a depth h in a direction toward the diaphragm 50 in the lamination direction Am10 as the Z-axis direction. The depth h of the pressure chamber 12 and the dummy pressure chamber 13 will be described in detail later.

In the present embodiment, the plurality of pressure chambers 12 is arranged in two rows, each having the Y-axis direction as the arrangement direction Am20. In the example of FIG. 3, the pressure chamber substrate 10 has two pressure chamber rows: a first pressure chamber row La having the Y-axis direction as the arrangement direction Am20 and a second pressure chamber row Lb having the Y-axis direction as the arrangement direction Am20. The second pressure chamber row Lb is arranged adjacent to the first pressure chamber row La in a direction intersecting the arrangement direction Am20 of the first pressure chamber row La. The direction intersecting the arrangement direction Am20 is also referred to as a channel direction Am30. In the example of FIG. 3, the channel direction Am30 is the X-axis direction, and the second pressure chamber row Lb is adjacent to the first pressure chamber row La in the −X direction.

The plurality of pressure chambers 12 and the one or more dummy pressure chambers 13 belonging to the first pressure chamber row La and the plurality of pressure chambers 12 and the dummy pressure chambers 13 belonging to the second pressure chamber row Lb are arranged so that their positions in the arrangement direction Am20 coincide with each other and are adjacent to each other in the channel direction Am30. This arrangement will be described in detail later.

In each pressure chamber row, the pressure chambers 12 are equally spaced from each other, the dummy pressure chambers 13 are equally spaced from each other, and the pressure chamber 12 and the dummy pressure chamber 13 are equally spaced from each other by a partition wall 11, as will be described below. The partition wall 11 is a part of the pressure chamber substrate 10 and divides the pressure chamber substrate 10. The pressure chamber 12 and the dummy pressure chamber 13 will be described in detail below.

As illustrated in FIG. 2, the coupling plate 15, the nozzle plate 20, and the compliance substrate 45 are laminated in order on the −Z direction side of the pressure chamber substrate 10. The coupling plate 15 is a flat member made of, for example, a silicon substrate. As illustrated in FIG. 4, the coupling plate 15 is provided with a nozzle coupling passage 16, a first manifold section 17, a second manifold section 18, and a supply coupling passage 19.

As illustrated in FIG. 4, the nozzle coupling passage 16 is a channel that couples the pressure chamber 12 and the nozzle 21. The first manifold section 17 and the second manifold section 18 function as part of a manifold 100, which serves as a common fluid chamber through which the plurality of pressure chambers 12 is coupled. The first manifold section 17 is provided so as to penetrate the coupling plate 15 in the Z-axis direction. In addition, the second manifold section 18 is provided on a surface on the −Z direction side of the coupling plate 15 without penetrating the coupling plate 15 in the Z-axis direction, as illustrated in FIG. 4.

The supply coupling passage 19 is a channel that is coupled to one end portion of the pressure chamber 12 in the X-axis direction. There is a plurality of supply coupling passages 19 arranged along the Y-axis direction, that is, the arrangement direction Am20, and provided separately for each of the pressure chambers 12. The supply coupling passage 19 couples the second manifold section 18 and each of the pressure chambers 12 to supply ink in the manifold 100 to each of the pressure chambers 12.

The nozzle plate 20 is provided on the opposite side of the pressure chamber substrate 10 across the coupling plate 15, that is, on a surface on the +Z direction side of the coupling plate 15. The material of nozzle plate 20 is, for example, a silicon substrate.

A plurality of nozzles 21 is formed in the nozzle plate 20. Each nozzle 21 is coupled to each pressure chamber 12 via the nozzle coupling passage 16. As illustrated in FIG. 2, the plurality of nozzles 21 is arrayed along the arrangement direction Am20 of the pressure chamber 12, that is, the Y-axis direction. The nozzle plate 20 has two nozzles rows in which the plurality of nozzles 21 is lined up. The two nozzle rows correspond to the first pressure chamber row La and the second pressure chamber row Lb, respectively.

As illustrated in FIG. 4, the compliance substrate 45 is provided together with the nozzle plate 20 on the opposite side of the pressure chamber substrate 10 across the coupling plate 15, that is, on a surface on the −Z direction side of the coupling plate 15. The compliance substrate 45 is provided around the nozzle plate 20, and covers the opening of the first manifold section 17 and the second manifold section 18 provided in the coupling plate 15. In the present embodiment, the compliance substrate 45 includes a sealing film 46 made of a flexible thin film and a fixed substrate 47 made of a rigid material such as metal. As illustrated in FIG. 4, a region of the fixed substrate 47 facing the manifold 100 is an opening portion 48 that is completely removed in the thickness direction. Hence, one side of the manifold 100 is a compliance section 49 sealed only by the sealing film 46.

As illustrated in FIG. 4, on the opposite side of the nozzle plate 20 and other components across the pressure chamber substrate 10, that is, on a surface on the −Z direction side of the pressure chamber substrate 10, the diaphragm 50 and the piezoelectric element 300 are laminated. The piezoelectric element 300 causes the diaphragm 50 to flex and deform to produce a pressure change in the ink in the pressure chamber 12. In FIG. 4, the configuration of the piezoelectric element 300 is simplified for ease of understanding of the technology. The piezoelectric element 300 will be described in detail later. The diaphragm 50 is provided on the +Z direction side of the piezoelectric element 300, and the pressure chamber substrate 10 is provided on the +Z direction side of the diaphragm 50.

As illustrated in FIG. 4, on a surface on the −Z direction side of the pressure chamber substrate 10, the protective substrate 30 having substantially the same size as the pressure chamber substrate 10 is also bonded by an adhesive or the like. The protective substrate 30 has a retention section 31 that is a space for protecting the piezoelectric element 300. The retention section 31 is provided for each row of piezoelectric elements 300 arranged along the arrangement direction Am20 which is the Y-axis direction, and in the present embodiment, two rows of retention sections 31 are formed next to each other in the X-axis direction. In addition, in the protective substrate 30, between the two rows of retention sections 31, there is a through hole 32 extending along the X-axis direction and penetrating along the +X direction.

As illustrated in FIG. 4, the case member 40 is fixed on the protective substrate 30. The case member 40, together with the coupling plate 15, forms the manifold 100 coupled to the plurality of pressure chambers 12. The case member 40 has substantially the same outline shape as the coupling plate 15 in plan view, and is bonded to the protective substrate 30 and the coupling plate 15.

The case member 40 has a storage section 41, a supply port 44, a third manifold section 42, and a coupling port 43. The storage section 41 is a space having a depth that can store the pressure chamber substrate 10 and the protective substrate 30. The third manifold section 42 is a space formed on both outer sides of the storage section 41 in the X-axis direction in the case member 40. The manifold 100 is formed by coupling the third manifold section 42 to the first manifold section 17 and the second manifold section 18 provided on the coupling plate 15. The manifold 100 has a long, continuous shape along the Y-axis direction. The supply port 44 is coupled to the manifold 100 and supplies ink to each manifold 100. The coupling port 43 is a through hole coupled to a through hole 32 of the protective substrate 30, and a relay substrate 120 is inserted therethrough.

In the liquid ejecting head 510 of the present embodiment, ink supplied from the ink tank 550 illustrated in FIG. 1 is taken in from the supply port 44 illustrated in FIG. 4. After filling the internal channels with ink from the manifold 100 to the nozzle 21, a voltage based on a drive signal is applied to each piezoelectric element 300 corresponding to the plurality of pressure chambers 12. This causes the diaphragm 50, together with the piezoelectric element 300 described below, to deflect and deform, increasing the pressure in each pressure chamber 12 and ejecting ink droplets from each nozzle 21.

One or more dummy pressure chambers 13 are not coupled to the manifold 100 and the nozzle 21. More specifically, the coupling plate 15 does not include a channel coupled to the dummy pressure chamber 13. Hence, no ink is supplied to the dummy pressure chamber 13.

Figure 5:
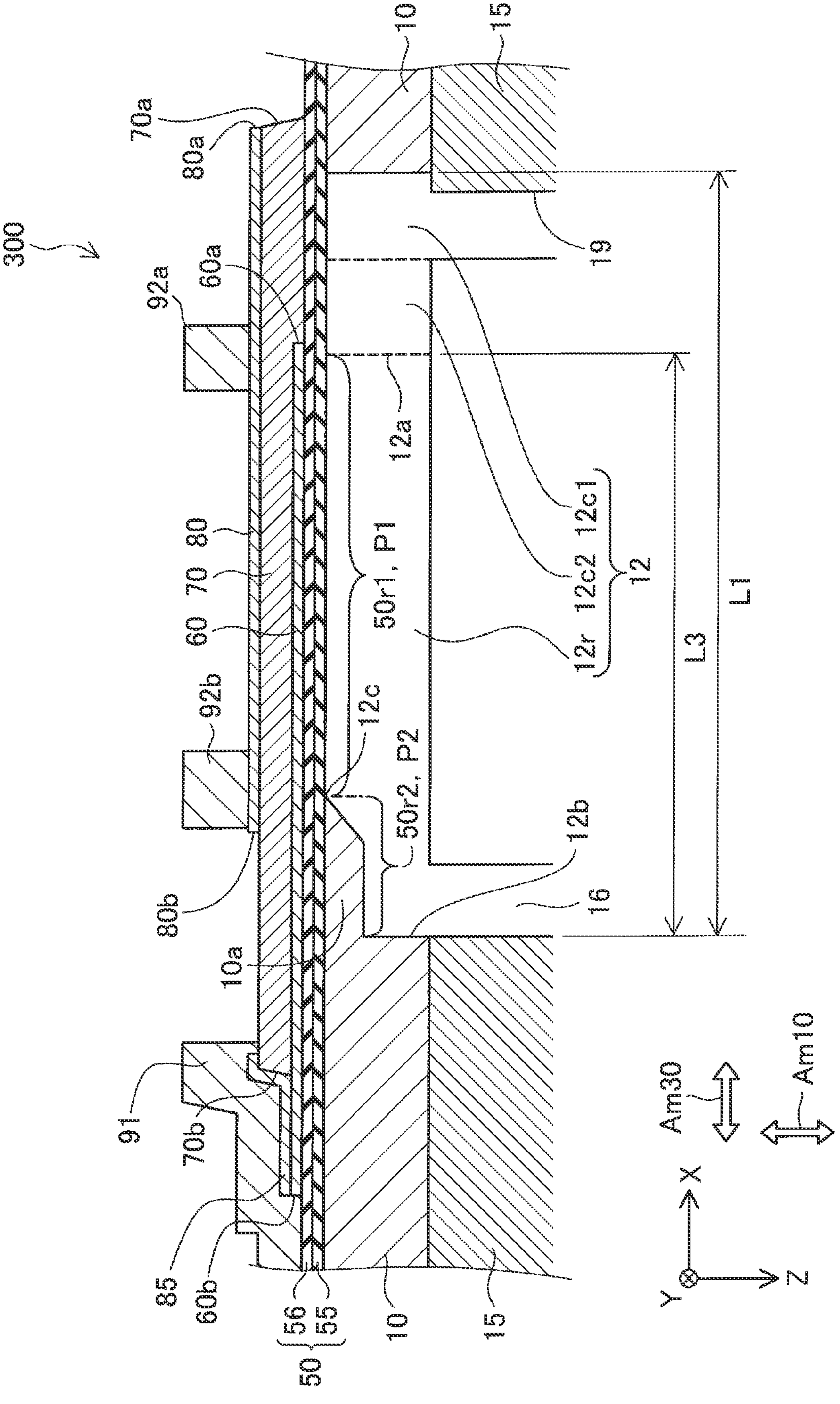
FIG. 5 is an enlarged cross-sectional view of the vicinity of a piezoelectric element of FIG. 4.
Figure 6:
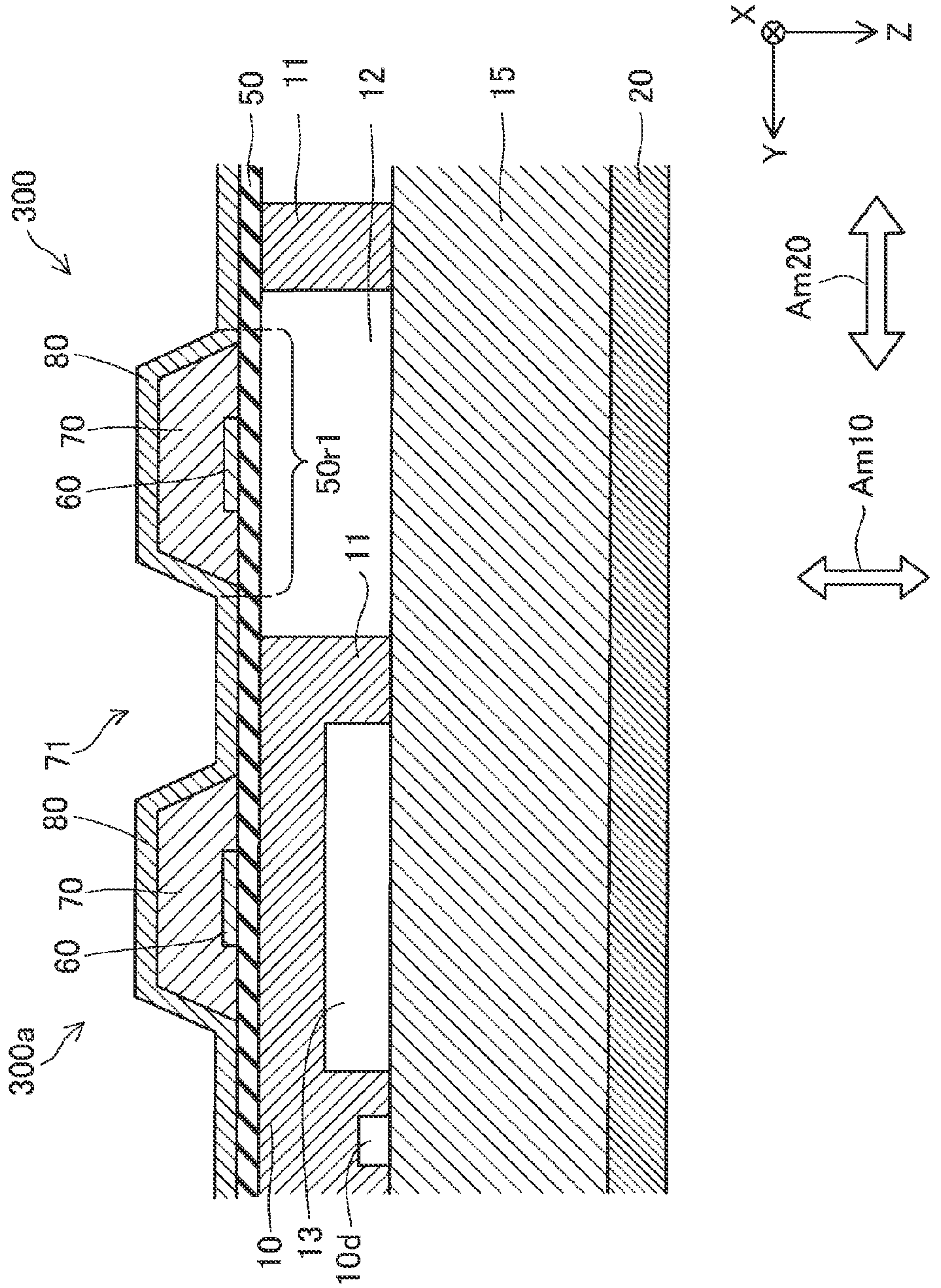
FIG. 6 is a cross-sectional view showing the VI-VI position of FIG. 3.

The configuration of the pressure chamber substrate 10 in the Z-axis direction will be described with reference to FIGS. 3 to 6. FIG. 5 is an enlarged cross-sectional view of the vicinity of the piezoelectric element 300 of FIG. 4. FIG. 6 is a cross-sectional view showing the VI-VI position of FIG. 3. As illustrated in FIG. 5, the liquid ejecting head 510 has, on the −Z direction side of the pressure chamber substrate 10 including the pressure chamber 12, an individual lead electrode 91 and a common lead electrode 92 in addition to the diaphragm 50 and the piezoelectric element 300.

Figure 7:
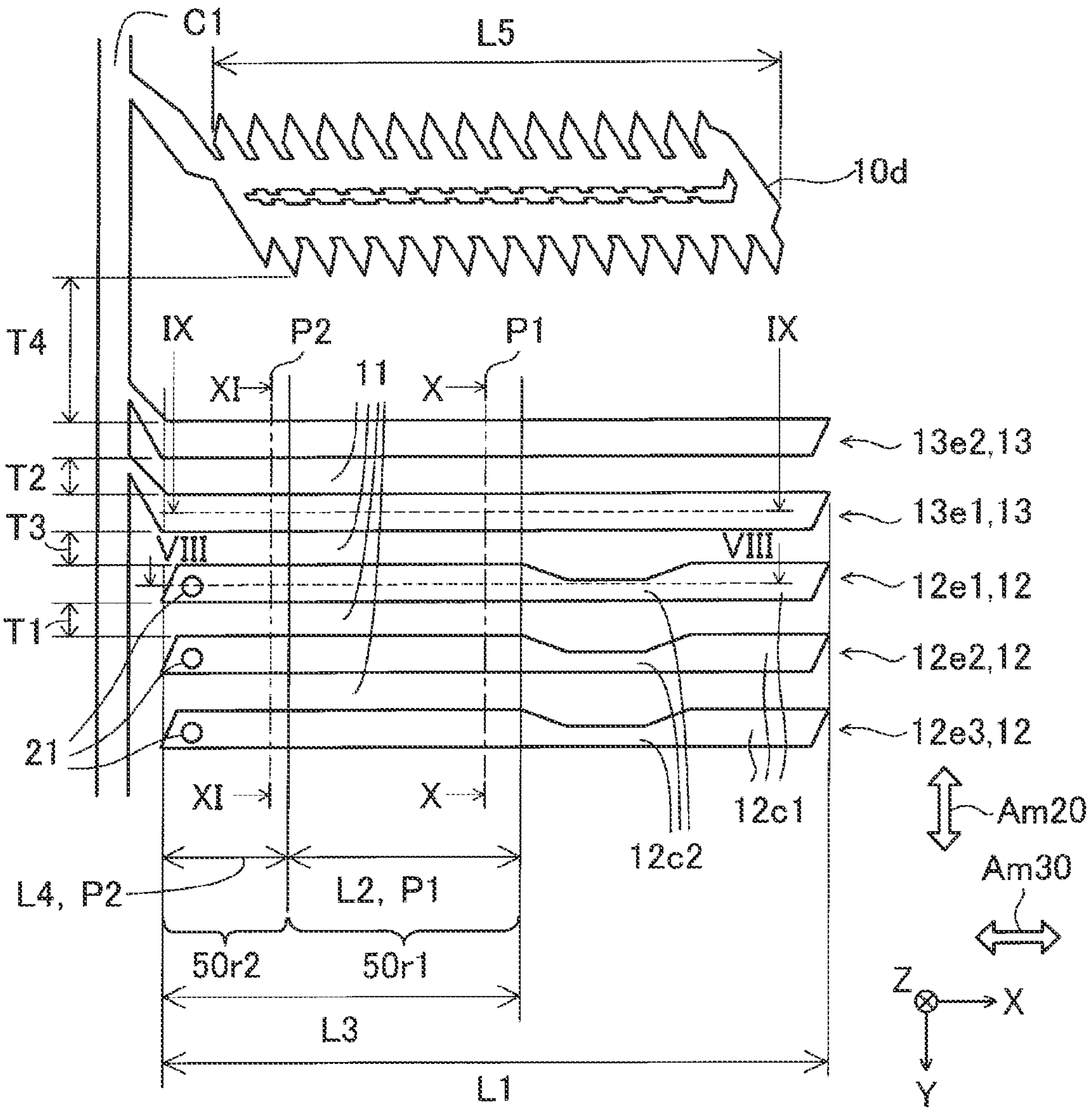
FIG. 7 is a plan view of the vicinity of a pressure chamber of FIG. 3.

The pressure chamber 12 is configured of an inlet 12*c*1, a supply passage 12*c*2, and a pressure section 12*r*, as illustrated in FIG. 5. Ink flows into the pressure chamber 12 from the inlet 12*c*1 coupled to the supply coupling passage 19. The Y-axis direction width of the pressure chamber 12 is narrower in the Y-axis direction in the supply passage 12*c*2. The Y-axis direction width of the supply passage 12*c*2 is illustrated in FIG. 7 described later. The supply passage 12*c*2 is a portion serving as a channel resistance to the incoming ink. Ink reaches the pressure section 12*r* by passing through the supply passage 12*c*2. In the present embodiment, a length L3 of the pressure chamber 12 described later is the length of the pressure section 12*r*. Ink passes through the pressure section 12*r* to reach the nozzle coupling passage 16. The structure of the pressure chamber 12 will be described in detail later.

The diaphragm 50 vibrates by driving each of the plurality of piezoelectric elements 300. As illustrated in FIG. 5, the diaphragm 50 is configured of an elastic film 55 made of a silicon oxide film provided on the pressure chamber substrate 10 side, and an insulator film 56 made of a zirconium oxide film. A channel formed on the pressure chamber substrate 10 such as the pressure chamber 12 is formed by anisotropic etching of the pressure chamber substrate 10 from the +Z direction side toward the −Z direction. A −Z direction side surface of the channel such as the pressure chamber 12 is configured of the elastic film 55. For ease of understanding of the technology, the elastic film 55 and the insulator film 56 are omitted in drawings other than FIG. 5.

The piezoelectric element 300 applies pressure to the pressure chamber 12. As illustrated in FIGS. 5 and 6, the piezoelectric element 300 has a first electrode 60, a piezoelectric layer 70, and a second electrode 80. The first electrode 60, the piezoelectric layer 70, and the second electrode 80 are laminated in order from the +Z direction side toward the −Z direction side. The piezoelectric layer 70 is provided between the first electrode 60 and the second electrode 80 in the lamination direction Am10 in which the first electrode 60, the second electrode 80, and the piezoelectric layer 70 are laminated, that is, in the Z-axis direction.

As illustrated in FIG. 6, the dummy piezoelectric element 300*a* is an element that has the same configuration as the piezoelectric element 300 but is not driven. Each of the one or more dummy piezoelectric elements 300*a* is in an overlapping relationship with the dummy pressure chamber 13 when viewed along the lamination direction Am10.

Both of the first electrode 60 and the second electrode 80 are electrically coupled to the relay substrate 120 illustrated in FIG. 4. The first electrode 60 and the second electrode 80 apply a voltage corresponding to a drive signal to the piezoelectric layer 70. The first electrode 60 is supplied with different drive voltages depending on the ink ejection amount, and the second electrode 80 is supplied with a constant reference voltage signal regardless of the ink ejection amount. The ink ejection amount is the volume change amount required in the pressure chamber 12. When the piezoelectric element 300 is driven and a potential difference is generated between the first electrode 60 and the second electrode 80, the piezoelectric layer 70 is deformed. The deformation of the piezoelectric layer 70 causes the diaphragm 50 to deform or vibrate, changing the volume of the pressure chamber 12. The volume change of the pressure chamber 12 causes pressure to be applied to the ink stored in the pressure chamber 12, and ink is ejected from the nozzle 21 through the nozzle coupling passage 16.

As illustrated in FIG. 3, the first electrode 60 is an individual electrode provided separately for the plurality of pressure chambers 12. The first electrode 60 is configured of platinum (Pt), for example. As illustrated in FIG. 6, the Y-axis direction width of the first electrode 60 is narrower than the width of the pressure chamber 12. That is, both ends of the first electrode 60 in the Y direction are located inside both ends of the pressure chamber 12 in the Y direction. As illustrated in FIG. 5, an end portion 60*a* of the first electrode 60 in the +X direction is arranged inside the pressure chamber 12. An end portion 60*b* of the first electrode 60 in the −X direction is arranged outside the pressure chamber 12. For example, in the first pressure chamber row La, the end portion 60*a* of the first electrode 60 is positioned on the +X direction side of an end portion 12*a* of the pressure chamber 12 in the +X direction. The end portion 60*b* of the first electrode 60 is positioned on the −X direction side of an end portion 12*b* of the pressure chamber 12 on the −X direction side.

As illustrated in FIG. 5, the width of the piezoelectric layer 70 in the X-axis direction is longer than the width of the pressure chamber 12 in the X-axis direction, which is the longitudinal direction thereof. As illustrated in FIG. 5, the piezoelectric layer 70 is provided extending along the arrangement direction Am20 of the pressure chamber 12, that is, the X-axis direction. Therefore, on both sides of the pressure chamber 12 in the X-axis direction, the piezoelectric layer 70 extends to the outside of the pressure chamber 12. An example of the piezoelectric layer 70 is a crystal film of perovskite structure made of a ferroelectric ceramic material that exhibits an electromechanical conversion action, so-called perovskite-type crystal, formed on the first electrode 60. In the present embodiment, lead zirconate titanate (PZT) is used as the piezoelectric layer 70, but the piezoelectric layer 70 is not limited to this.

As illustrated in FIG. 5, in the first pressure chamber row La, an end portion 70*a* of the piezoelectric layer 70 in the +X direction is located on the +X direction side, which is outside the end portion 60*a* of the first electrode 60. That is, the end portion 60*a* of the first electrode 60 is covered with the piezoelectric layer 70. On the other hand, an end portion 70*b* of the piezoelectric layer 70 in the −X direction is located on the −X direction side, which is inside the end portion 60*b* of the first electrode 60, and the end portion 60*b* of the first electrode 60 is not covered with the piezoelectric layer 70.

As illustrated in FIG. 6, the piezoelectric layer 70 has a groove portion 71 that is thinner than the other regions. The groove portion 71 is provided at a position corresponding to each partition wall 11. The groove portion 71 is formed by completely removing the piezoelectric layer 70 in the Z-axis direction. By providing the groove portion 71 in the piezoelectric layer 70, the stiffness of a portion of the diaphragm 50 facing the X-axis direction end portion of the pressure chamber 12, the so-called arm portion of the diaphragm 50, is reduced, allowing the piezoelectric element 300 to be displaced more favorably.

As illustrated in FIGS. 5 and 6, the second electrode 80 is provided on the opposite side of the first electrode 60 across the piezoelectric layer 70, that is, on the −Z direction side of the piezoelectric layer 70. As illustrated in FIG. 3, the second electrode 80 is common to a plurality of pressure chambers 12, and is a common electrode for a plurality of active regions 50*r*1 described later. In the present embodiment, iridium (Ir) is used as the second electrode 80.

As illustrated in FIG. 3, the second electrode 80 has a predetermined width in the X-axis direction and is provided extending along the arrangement direction Am20 of the pressure chamber 12, that is, the Y-axis direction. As illustrated in FIG. 6, the second electrode 80 is also provided on the sides of the groove portion 71 of the piezoelectric layer 70 and on the insulator film 56, which is the bottom of the groove portion 71.

As illustrated in FIG. 5, an end portion 80*a* of the second electrode 80 in the +X direction is arranged outside the end portion 60*a* of the first electrode 60 covered with the piezoelectric layer 70, that is, on the +X direction side. The end portion 80*a* of the second electrode 80 is located outside the end portion 12*a* of the pressure chamber 12 and outside the end portion 60*a* of the first electrode 60. In the present embodiment, the end portion 80*a* of the second electrode 80 substantially coincides with the end portion 70*a* of the piezoelectric layer 70 in the X-axis direction.

As illustrated in FIG. 5, an end portion 80*b* of the second electrode 80 in the −X direction is arranged on the +X direction side, which is inside the end portion 12*b* of the pressure chamber 12 in the −X direction, and is arranged on the +X direction side, which is inside the end portion 70*b* of the piezoelectric layer 70. The end portion 70*b* of the piezoelectric layer 70 is located inside the end portion 60*b* of the first electrode 60 in the +X direction. Accordingly, the end portion 80*b* of the second electrode 80 is located on the piezoelectric layer 70, which is on the +X direction side of the end portion 60*b* of the first electrode 60. On the −X direction side of the end portion 80*b* of the second electrode 80, there is a portion where the surface of the piezoelectric layer 70 is exposed. Thus, the end portion 80*b* of the second electrode 80 is arranged on the +X direction side of the end portion 70*b* of the piezoelectric layer 70 and the end portion 60*b* of the first electrode 60.

Outside the end portion 80*b* of the second electrode 80, there is a wiring section 85 that is the same layer as the second electrode 80 but is electrically discontinuous with the second electrode 80. The wiring section 85 is formed from the vicinity of the end portion 70*b* of the piezoelectric layer 70 to the end portion 60*b* of the first electrode 60, spaced from the end portion 80*b* of the second electrode 80. The wiring section 85 is provided for each piezoelectric element 300. That is, a plurality of wiring sections 85 is arranged at predetermined intervals along the Y-axis direction.

In the piezoelectric element 300, as illustrated in FIG. 5, when viewed along the lamination direction Am10, a region in which the pressure chamber 12, the diaphragm 50, the first electrode 60, the piezoelectric layer 70, and the second electrode 80 overlap and which does not overlap a stepped portion 10*s* described below, and a section in the X-axis direction defined by the region are referred to as the active region 50*r*1. Any position of the active region 50*r*1 in the channel direction Am30, which is the direction intersecting the lamination direction Am10 and the arrangement direction Am20, is also referred to as a first position P1.

As illustrated in FIG. 5, when the piezoelectric element 300 is viewed along the lamination direction Am10, an inactive region 50*r*2 is a region other than the active region 50*r*1 and a region where at least a portion of the pressure chamber 12, the stepped portion 10*s* of the pressure chamber substrate 10 dividing the pressure chamber 12, and the diaphragm 50 overlap, and a section in the X-axis direction defined by the region. Note that for convenience of explanation, hereinbelow, only the region located in the −X direction of the active region 50*r*1 is referred to as the inactive region 50*r*2. Here, the stepped portion 10*s* is a portion where, when the pressure chamber 12 is viewed in the −Z direction, a part of the pressure chamber substrate 10 remains and the diaphragm 50 is not exposed. In the X-axis direction, any position in the inactive region 50*r*2 is also referred to as a second position P2. The second position P2 is a position closer to the nozzle 21 than the first position P1 in the channel direction Am30. The inactive region 50*r*2 is a region closer to the nozzle 21 than the active region 50*r*1.

As illustrated in FIGS. 3 and 5, in the piezoelectric element 300, the individual lead electrode 91 is electrically coupled to the first electrode 60 which is an individual electrode, and the common lead electrode 92 which is a common electrode for driving is electrically coupled to the second electrode 80 which is a common electrode. The individual lead electrode 91 and the common lead electrode 92 function as drive wiring for applying the voltage that drives the piezoelectric layer 70 to the piezoelectric layer 70.

In the dummy piezoelectric element 300*a*, too, the second electrode 80 is electrically coupled to the relay substrate 120 which will be described later, as in the piezoelectric element 300. That is, the second electrode 80 and the common lead electrode 92 are electrically coupled to each other. On the other hand, as understood from FIG. 3, in the dummy piezoelectric element 300*a*, the first electrode 60 is not electrically coupled to the individual lead electrode 91. Therefore, no voltage is applied to the piezoelectric layer 70 of the dummy piezoelectric element 300*a*. In other words, the dummy piezoelectric element 300*a* is not driven. Therefore, the dummy pressure chamber 13 does not contribute to ink ejection.

As illustrated in FIGS. 3 and 4, the individual lead electrode 91 and the common lead electrode 92 are extended to be exposed in the through hole 32 formed in the protective substrate 30, and are electrically coupled to the relay substrate 120 in the through hole 32. The relay substrate 120 has a plurality of wirings for coupling with a control substrate and a power circuit, which are not illustrated in the drawing. In the present embodiment, the relay substrate 120 is configured of, for example, a flexible substrate (FPC: flexible printed circuit).

An integrated circuit 121 with switching elements is mounted on the relay substrate 120. The integrated circuit 121 is input with a signal for driving the piezoelectric element 300 propagating on the relay substrate 120. The integrated circuit 121 controls the timing at which the signal for driving the piezoelectric element 300 is supplied to the first electrode 60 based on the input signal. This controls the timing at which the piezoelectric element 300 is driven and the drive amount of the piezoelectric element 300.

The material of the individual lead electrode 91 and the common lead electrode 92 is gold (Au). The individual lead electrode 91 is provided for each piezoelectric element 300, that is, for each first electrode 60. As illustrated in FIG. 5, for example, the individual lead electrode 91 is coupled near the end portion 60*b* of the first electrode 60 via the wiring section 85 in the first pressure chamber row La, and is drawn in the −X direction to the diaphragm 50.

As illustrated in FIG. 3, for example, in the first pressure chamber row La, the common lead electrode 92 is bent at both end portions in the X-axis direction and is drawn in the −X direction from the second electrode 80 to the diaphragm 50. The common lead electrode 92 has an extended portion 92*a* and an extended portion 92*b*. As illustrated in FIG. 5, for example, in the first pressure chamber row La, the extended portion 92*a* is extended along the X-axis direction in a region corresponding to the end portion 12*a* of the pressure chamber 12, and the extended portion 92*b* is extended along the X-axis direction in a region corresponding to the end portion 12*c* of the pressure chamber 12. The end portion 12*c* of the pressure chamber 12 is an end portion of the active region 50*r*1 in the −x direction. The extended portion 92*a* and the extended portion 92*b* are provided continuously over the Y-axis direction for the plurality of active regions 50*r*1. The extended portion 92*a* and the extended portion 92*b* extend from the inside of the pressure chamber 12 to the outside of the pressure chamber 12 in the Y-axis direction.

Accordingly, the liquid ejecting head 510 has a laminated body 310 in which a plurality of piezoelectric elements 300, the diaphragm 50, and the pressure chamber substrate 10 are laminated, the pressure chamber substrate 10 forming the plurality of pressure chambers 12 coupled to the nozzle 21 and applying pressure to the liquid by vibration of the diaphragm 50 to contribute to the ejection of the liquid, and the one or more dummy pressure chambers 13 that do not contribute to the ejection of the liquid. Furthermore, as illustrated in FIG. 6, the liquid ejecting head 510 has a laminated structure in which the piezoelectric element 300 including the first electrode 60, the piezoelectric layer 70, and the second electrode 80, the diaphragm 50 that vibrates when driven by the piezoelectric element 300, and the pressure chamber substrate 10 having the partition wall 11 that together with the diaphragm 50 defines the pressure chamber 12 coupled to the nozzle 21 are laminated.

A3. Detailed Configuration of Pressure Chamber and Dummy Pressure Chamber

A plurality of pressure chambers 12 is coupled to the nozzle 21 and contributes to the ejection of liquid by applying pressure to the liquid through the vibration of diaphragm 50. One or more dummy pressure chambers 13 do not contribute to the ejection of the liquid. The term "not contributing to the ejection of liquid" means that no pressure is applied to the liquid for ejection thereof.

FIG. 7 is a plan view of the vicinity of a pressure chamber 12*e*1 of FIG. 3. The plurality of pressure chambers 12 is arranged by being divided into the first pressure chamber row La and the second pressure chamber row Lb in the X-axis direction as described above. FIG. 7 illustrates the vicinity of the pressure chamber 12*e*1 arranged at the end portion in the −Y direction of the pressure chambers 12 belonging to the first pressure chamber row La illustrated in FIG. 3. In FIG. 7, only the flat surface of pressure chamber substrate 10 is shown to illustrate the relationship between pressure chamber 12 and dummy pressure chamber 13.

As illustrated in FIG. 3, one or more dummy pressure chambers 13 are arranged adjacent to the pressure chamber 12*e*1 at the end portion in the Y-axis direction of the pressure chamber row. As illustrated in FIG. 7, the plurality of pressure chambers 12 is referred to as a pressure chamber 12*e*2 and a pressure chamber 12*e*3, in order from the pressure chamber 12*e*1 at the end portion closest to the center of the pressure chamber substrate 10. One or more dummy pressure chambers 13 are referred to as a dummy pressure chamber 13*e*1 and a dummy pressure chamber 13*e*2 in order of distance from the pressure chamber 12*e*1 at the end portion.

The plurality of pressure chambers 12 and one or more dummy pressure chambers 13 are arranged with equal spacing in the arrangement direction Am20. The spacing is the thickness of the partition wall 11 at the position of the active region 50*r*1 in the X-axis direction. Spacing T2 between the dummy pressure chambers 13 in the Y-axis direction is equal to spacing T1 between the pressure chambers 12. That is, "equal spacing" means that the thicknesses of the partition wall 11 at the spacing T2 between the dummy pressure chambers 13 and the partition wall 11 at the spacing T1 between the pressure chambers 12 are equal. Furthermore, spacing T3 between the dummy pressure chamber 13*e*1 at the end portion and the pressure chamber 12*e*1 at the end portion adjacent in the Y-axis direction is also equal to the spacing T1 and the spacing T2.

Furthermore, when the direction orthogonal to the lamination direction Am10 and the arrangement direction Am20 is the channel direction Am30, and when viewed along the arrangement direction Am20, a range in the channel direction Am30 where the active region 50*r*1 of the pressure chamber 12*e*1 at the end portion is provided is included in the dummy pressure chamber 13. The channel direction Am30 is the X-axis direction in FIG. 7. That is, as illustrated in FIG. 7, in the X-axis direction, when a length L1 is the range of the dummy pressure chamber 13*e*1 at the end portion and a length L2 is the range of the active region 50*r*1, the length L1 is greater than or equal to the length L2 and is a range including the location of the length L2.

Moreover, in the X-axis direction, when the length L3 is the range of the pressure chamber 12*e*1 at the end portion, the length L3 is the sum of the length L2 and a length L4, which is the range of the inactive region 50*r*2 of the pressure chamber 12*e*1 at the end portion.

That is, the pressure chamber 12*e*1 at the end portion being adjacent to the dummy pressure chamber 13*e*1 at the end portion is a state where the spacing T1 to spacing T3 are equal and the length L2 range is located inside the length L1 range, as described above. In the pressure chamber substrate 10, a state in which no other space is provided between the pressure chamber 12*e*1 at the end portion and the dummy pressure chamber 13*e*1 at the end portion can indicate that the pressure chamber 12*e*1 at the end portion is adjacent to the dummy pressure chamber 13*e*1 at the end portion.

As illustrated in FIG. 7, the pressure chamber substrate 10 has dimples 10*d*. The dimple 10*d* is a recess with a depth hd in the −Z direction, which is the direction toward the diaphragm 50 in the lamination direction Am10. The dimple 10*d* facilitates application of an adhesive by serving as a recess on the pressure chamber substrate 10 when the adhesive is applied for bonding the coupling plate 15 and the pressure chamber substrate 10. Therefore, the shape and position of the dimple 10*d* is determined based on the bonding conditions. The depth hd of the dimple 10*d* will be described later. The dummy pressure chamber 13 is placed between the dimples 10*d* and the pressure chamber 12 in the arrangement direction Am20. In the dimples 10*d*, a range L5 in the X-axis direction and spacing T4 with the dummy pressure chamber 13 in the Y-axis direction are different from the spacing T1 to spacing T3 and the range L1 to range L4.

A channel C1 is an air channel for adjusting the internal pressure of the dimples 10*d* and the dummy pressure chamber 13. The internal pressure of the dimples 10*d* and the dummy pressure chamber 13 fluctuates due to the vibration of the pressure chamber substrate 10 caused by driving of the piezoelectric element 300 and ink flow. The channel C1 is coupled to the outside of the pressure chamber substrate 10. The channel C1 is coupled to the dimples 10*d* and the dummy pressure chamber 13 to create an air escape route. Thus, the channel C1 prevents fluctuation of the internal pressure.

Figure 8:
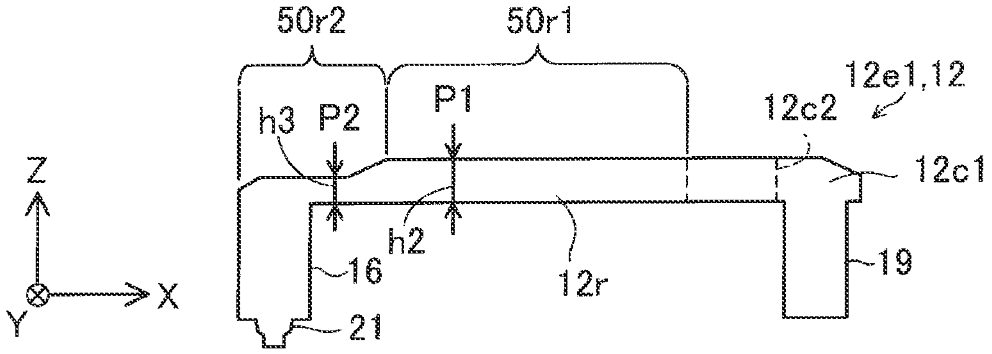
FIG. 8 is an explanatory drawing illustrating a cross section of the pressure chamber at the VII-VII position of FIG. 7.

FIG. 8 is an explanatory drawing illustrating a cross section of the pressure chamber 12*e*1 at the VII-VII position of FIG. 7. FIG. 8 illustrates the depth h of the pressure chamber 12*e*1 in the Z-axis direction. In FIG. 8, the supply coupling passage 19 and the nozzle coupling passage 16 leading to the pressure chamber 12*e*1 are shown to facilitate understanding of the technology.

Note that in the following description, the depth h is the maximum or average value in a specific range. A specific range is the range of the active region 50*r*1 or the inactive region 50*r*2 in the pressure chamber 12 or the dummy pressure chamber 13. For example, a second depth h2 described later is the maximum or average value of the depth h in the active region 50*r*1 of the pressure chamber 12. The average value of the depth h is obtained from the average of the depth h of both end portions and the depth h of the center portion at equal distance from both end portions in the channel direction Am30 in the specific range.

In FIG. 8, the second depth h2 as the depth h in the first position P1 is the maximum or average value of the depth h in the active region 50*r*1. When the depth h of the second position P2 is a third depth h3, the third depth h3 is shallower than the second depth h2. That is, the depth h of the recess of the pressure chamber 12*e*1 is shallower on the nozzle coupling passage 16 side than on the supply coupling passage 19 side.

Figure 9:
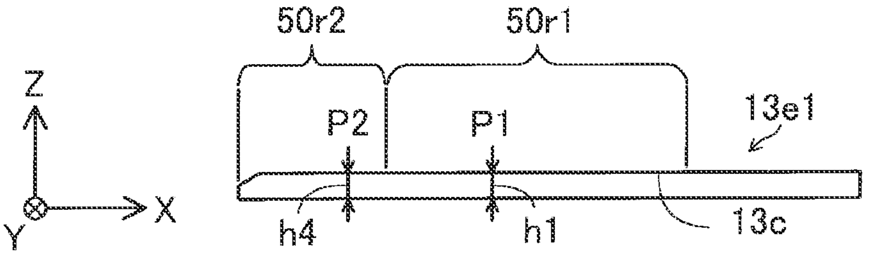
FIG. 9 is an explanatory drawing illustrating the IX-IX cross section of FIG. 7 for a dummy pressure chamber.

FIG. 9 is an explanatory drawing illustrating the IX-IX cross section of FIG. 7 for the dummy pressure chamber 13*e*1. A first depth h1 as the depth h of the first position P1 and a fourth depth h4 as the depth h of the second position P2 of the dummy pressure chamber 13*e*1 are of substantially equal depth. In addition, "substantially equal depth" is a concept that allows an error of a few tens of micrometers. In other words, the depth h of the dummy pressure chamber 13*e*1 is a constant depth h in the X-axis direction. A bottom surface 13*c* of the dummy pressure chamber 13*e*1 is a wavy surface, as will be described later. Therefore, this constant depth h means that the design value of the depth h of the dummy pressure chamber 13*e*1 is constant. Here, the positions of the first position P1 and the second position P2 in the X-axis direction in FIGS. 8 and 9 are common.

A4. Relationship Between Depths of Pressure Chamber and Dummy Pressure Chamber

Figure 10:
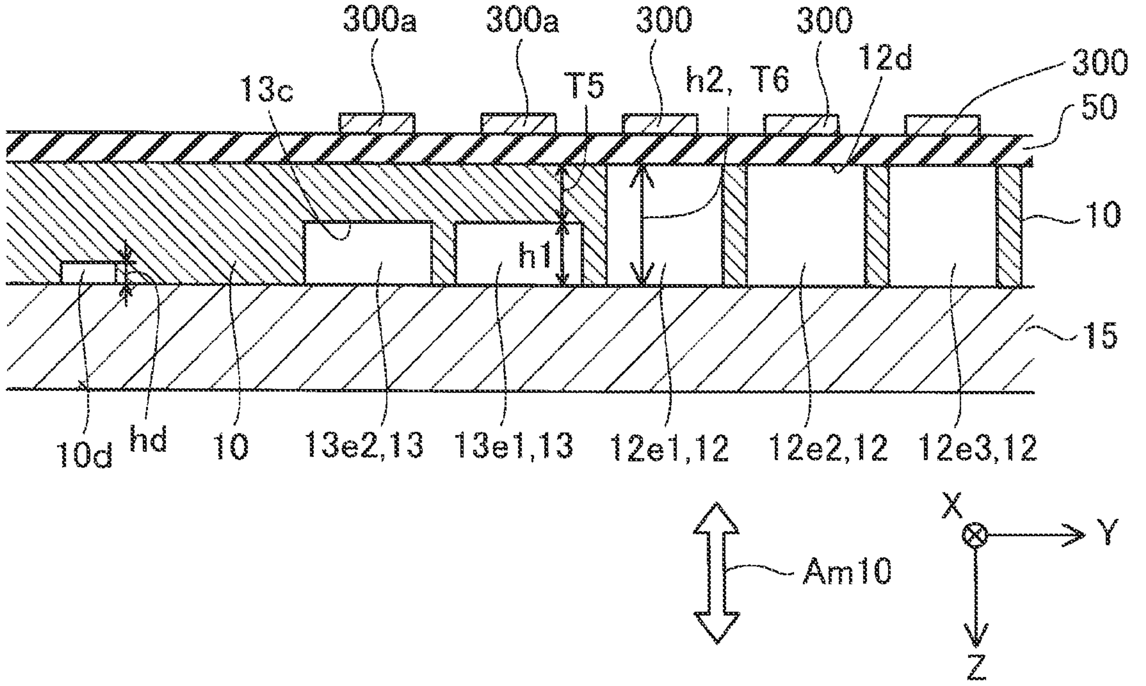
FIG. 10 is an explanatory drawing illustrating the X-X cross section of FIG. 7 at a first position.

FIG. 10 is an explanatory drawing illustrating the X-X cross section of FIG. 7 at the first position P1. The relationship between the depth h of the pressure chamber 12 and the dummy pressure chamber 13 will be described. FIG. 10 illustrates the depth h of the pressure chamber 12*e*1 and the dummy pressure chamber 13*e*1 in the active region 50*r*1 in the X-axis direction. In the laminated body 310, as described above, each of the plurality of pressure chambers 12 and each of the one or more dummy pressure chambers 13 are recesses having the depth h in the direction toward the diaphragm 50 in the lamination direction Am10. Note that in FIG. 10, the piezoelectric element 300 is simplified and the nozzle plate 20 is omitted to facilitate understanding of the technology. Furthermore, the pressure chamber 12 and the dummy pressure chamber 13 are illustrated based on FIG. 7, but illustration of the dimples 10*d* is simplified to facilitate understanding of the technology.

The recesses in the pressure chamber 12 and the dummy pressure chamber 13 are formed by anisotropic etching performed on the pressure chamber substrate 10 in the direction from the coupling plate 15 to the diaphragm 50. As illustrated in FIG. 5, the elastic film 55 made of silicon oxide, which forms the diaphragm 50, functions as a stop layer against this anisotropic etching. That is, the recess of the pressure chamber 12 is formed in the pressure chamber substrate 10 so that it penetrates from the coupling plate 15 to the diaphragm 50. Note, however, that in the inactive region 50*r*2, the recess of the pressure chamber 12*e* does not penetrate the pressure chamber substrate 10, as illustrated in FIG. 5. The recess of the pressure chamber 12*e* penetrates the pressure chamber substrate 10 in the active region 50*r*1.

Unlike the pressure chamber 12, the recess of the dummy pressure chamber 13 does not penetrate the pressure chamber substrate 10, as illustrated in FIG. 10. In the formation of the dummy pressure chamber 13, anisotropic etching is performed from the coupling plate 15 toward the diaphragm 50, to the middle of the pressure chamber substrate 10. That is, the bottom surface 13*c* of the recess of dummy pressure chamber 13 depends on the accuracy of the anisotropic etching processing, since the depth h is not defined by the stop layer. Hence, the bottom surface 13*c* of the recess of the dummy pressure chamber 13 is a wavy surface. For example, the bottom surface 13*c* of the recess of the dummy pressure chamber 13 has an unevenness of about ±10 μm relative to the design value of the depth h. To facilitate understanding of the technology, the bottom surface 13*c* of the dummy pressure chamber 13 in the drawing is shown as a flat surface.

Hence, the plurality of pressure chambers 12 are defined by the pressure chamber substrate 10 and the diaphragm 50. One or more dummy pressure chambers 13 are defined by the pressure chamber substrate 10. Furthermore, one or more dummy pressure chambers 13 are not defined by the diaphragm 50.

As illustrated in FIG. 10, the first depth h1 as the depth h of the dummy pressure chamber 13 is formed shallower than the second depth h2 as the depth h of the pressure chamber 12. More specifically, the first depth h1 is half of the second depth h2.

The depth hd of the dimple 10*d* is a shallower depth h than the first depth h1 to the fourth depth h4. That is, the depth hd of the dimple 10*d* is a shallower recess than the depth h of the pressure chamber 12 and the dummy pressure chamber 13.

Figure 11:
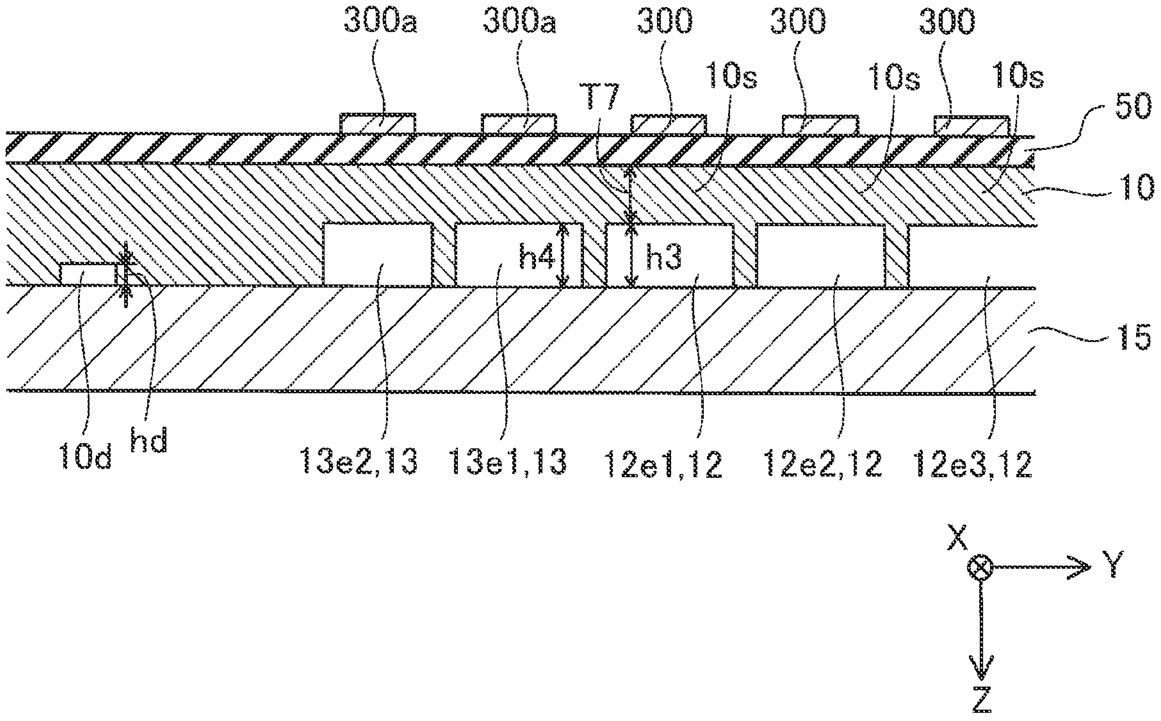
FIG. 11 is an explanatory drawing illustrating the XI-XI cross section of FIG. 7 at a second position.

FIG. 11 is an explanatory drawing illustrating the XI-XI cross section of FIG. 7 at the second position P2. As mentioned above, the pressure chamber 12 has the third depth h3 at the second position P2, which is shallower than the second depth h2 at the first position P1. That is, the first depth h1 as the depth h of the dummy pressure chamber 13 and the third depth h3 at the second position P2 in the pressure chamber 12 are shallower than the second depth h2 at the first position P1 in the pressure chamber 12. More specifically, at the second position P2, the fourth depth h4 of the dummy pressure chamber 13 and the third depth h3 of the pressure chamber 12 are of substantially equal depth h. As mentioned above, the bottom surface 13*c* of the recess up to the middle of the pressure chamber substrate 10 becomes a wavy surface during anisotropic etching. Hence, the depth h of the first depth h1 and the third depth h3 are formed equal in design, but include an error of +10 μm with respect to the design value.

As illustrated in FIGS. 10 and 11, the first depth h1 as the depth h of the dummy pressure chamber 13 is defined by a thickness T5 of the pressure chamber substrate 10 between the coupling plate 15 and the diaphragm 50. The second depth h2 as the depth h of the first position P1 of the pressure chamber 12*e*1 is defined by a thickness T6 of the pressure chamber substrate 10. The third depth h3 as the depth h of the second position P2 of the pressure chamber 12*e*1 is defined by a thickness T7 of the stepped portion 10*s* of the pressure chamber substrate 10 from the coupling plate 15 to the diaphragm 50.

In summary, at the first position P1 in the active region 50*r*1, the first depth h1 of the dummy pressure chamber 13 is shallower than the second depth h2 of the pressure chamber 12. In the second position P2 of the inactive region 50*r*2, the fourth depth h4 of the dummy pressure chamber 13 is substantially equal to the third depth h3 of the pressure chamber 12. The first depth h1 and the fourth depth h4 of the dummy pressure chamber 13 are substantially equal. Accordingly, the difference between the fourth depth h4 and the third depth h3 in the second position P2 of the inactive region 50*r*2 illustrated in FIG. 11 is smaller than the difference between the first depth h1 and the second depth h2 in the first position P1 of the active region 50*r*1 illustrated in FIG. 10.

A5. Function of Dummy Pressure Chamber

Figure 12:
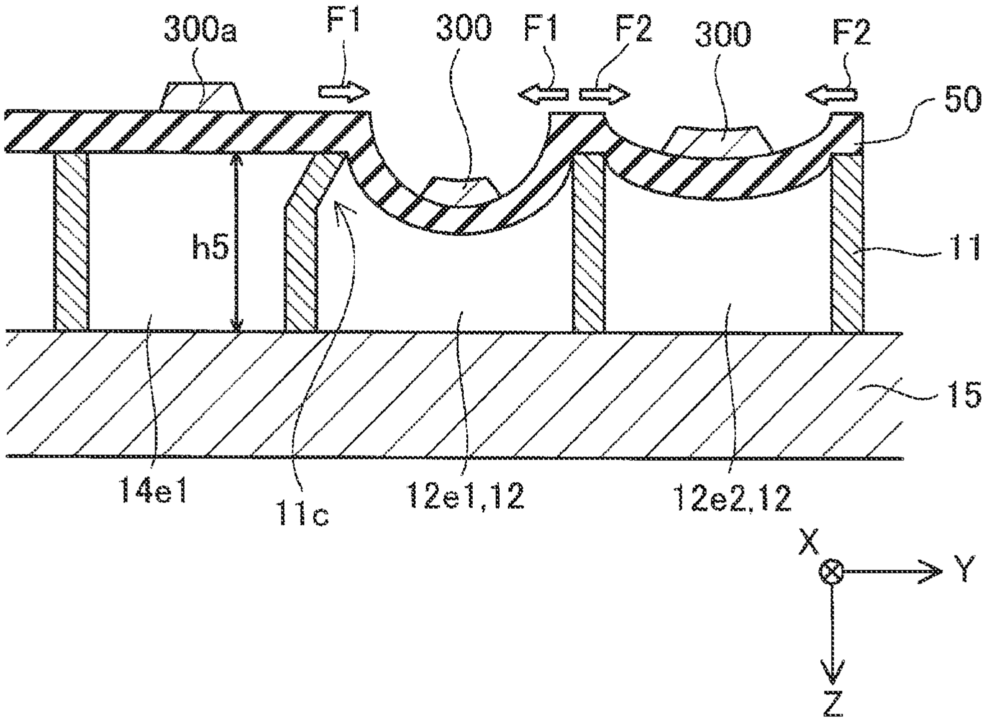
FIG. 12 is an explanatory drawing illustrating a cross section of a dummy pressure chamber as a comparative example.

FIG. 12 is an explanatory drawing illustrating a cross section of a dummy pressure chamber 14*e*1 as a comparative example when the piezoelectric element 300 is driven. In FIG. 12, the configuration is shown with the pressure chamber 12*e*1 and the pressure chamber 12*e*2 in the first position P1 as in FIG. 10, and the dummy pressure chamber 13*e*1 replaced by the dummy pressure chamber 14*e*1. The dummy pressure chamber 14*e*1 is not the dummy pressure chamber 13 of the present disclosure, but is a comparative example to illustrate the function of the dummy pressure chamber 13 of the present disclosure. The dummy pressure chamber 14*e*1 is the same through hole as the pressure chamber 12*e*1. That is, a fifth depth h5 of the dummy pressure chamber 14*e*1 is the same as the second depth h2 of the pressure chamber 12*e*1. The dummy piezoelectric element 300*a* provided in the dummy pressure chamber 14*e*1 has the same configuration as the dummy piezoelectric element 300*a* of the dummy pressure chamber 13*e*1. That is, the dummy pressure chamber 14*e*1 does not contribute to ink ejection in the same way as the dummy pressure chamber 13*e*1.

The piezoelectric element 300 applies pressure in the +Z direction when the piezoelectric element 300 is driven. At this time, the diaphragm 50 facing the pressure chamber 12*e*1 deflects toward the inside of the pressure chamber 12 and receives tension F1 toward the piezoelectric element 300. The piezoelectric element 300 applies pressure to the diaphragm 50 because a standby voltage is being applied, even when ink ejection is not required. For example, the piezoelectric element 300 applies tension F2 to the diaphragm 50 facing the pressure chamber 12*e*1 when it is applying a standby voltage to the pressure chamber 12*e*2. Hence, the partition wall 11 between the pressure chambers 12 is not pulled by one of the pressure chambers 12.

However, the diaphragm 50 facing the dummy pressure chamber 14*e*1 does not drive the dummy piezoelectric element 300*a* and therefore does not receive tension toward the dummy piezoelectric element 300*a*. Hence, in the partition wall 11 between the dummy pressure chamber 14*e*1 and the pressure chamber 12*e*1, a portion 11*c* of the partition wall 11 in the vicinity of the diaphragm 50 may be deformed when pulled unilaterally toward the pressure chamber 12*e*1 side. Deformation of the partition wall 11 affects the pressure fluctuation by changing the volume of the pressure chamber 12*e*1. That is, pressure loss varies between the pressure chamber 12*e*1 adjacent to the dummy pressure chamber 14*e*1 and the pressure chamber 12*e*2 not adjacent to the dummy pressure chamber 14*e*1. Due to variations in pressure loss, the liquid ejection characteristics of each of the plurality of pressure chambers 12 also vary depending on the position of the array of pressure chambers 12. More specifically, as illustrated in FIG. 12, unintentional deformation of the portion 11*c* of the partition wall 11 between the dummy pressure chamber 14*e*1 and the pressure chamber 12*e*1 causes a difference in tension between the diaphragm 50 on the pressure chamber 12*e*1 adjacent to dummy pressure chamber 14*e*1, and the diaphragm 50 on the pressure chamber 12*e*2 not adjacent to the dummy pressure chamber 14*e*1. Therefore, even if the piezoelectric element 300 corresponding to the pressure chamber 12*e*1 and the piezoelectric element 300 corresponding to the pressure chamber 12*e*2 are driven equally, there will be a difference in ejection characteristics due to the difference in tension of the diaphragm 50.

Since the dummy pressure chamber 14*e*1 is provided with the dummy piezoelectric element 300*a*, for example, when a standby voltage is applied to the dummy piezoelectric element 300*a*, the tension F2 is generated as in the pressure chamber 12*e*2. However, the dummy pressure chamber 14*e*1 consumes energy during the ejection of ink by the liquid ejecting apparatus 500 due to a standby voltage that does not contribute to the ejection of ink.

Figure 13:
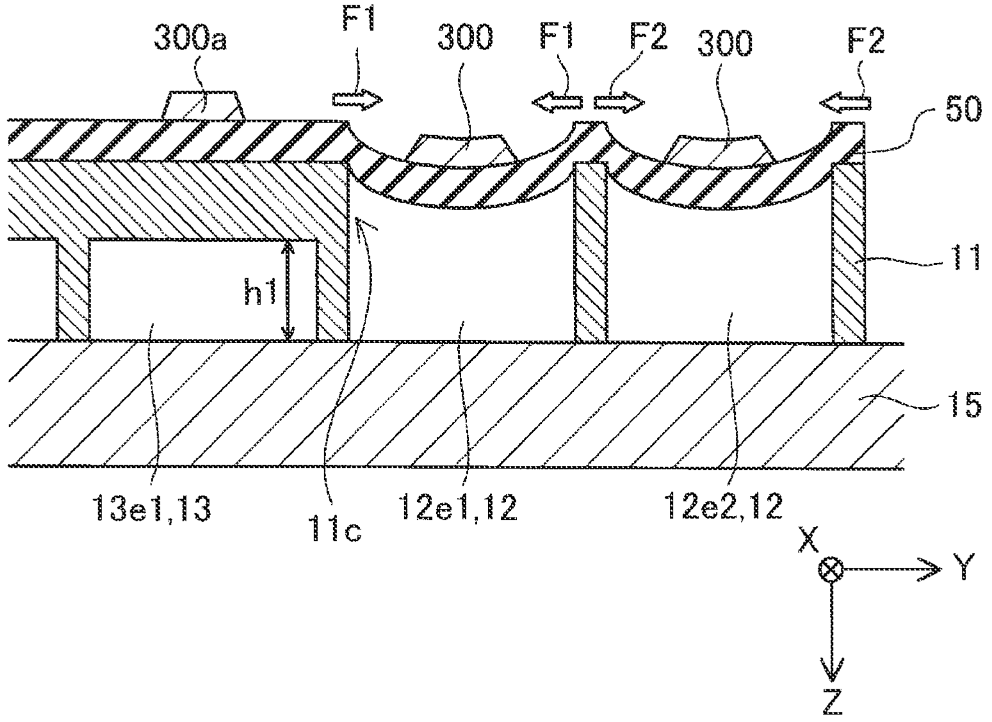
FIG. 13 is an explanatory drawing illustrating a cross section of the dummy pressure chamber of the embodiment of the present disclosure.

FIG. 13 is an explanatory drawing illustrating a cross section of the dummy pressure chamber 13*e*1 of the embodiment of the present disclosure when the piezoelectric element 300 is driven. FIG. 13 illustrates a configuration in which the dummy pressure chamber 14*e*1 of the comparative example of FIG. 12 is replaced by the dummy pressure chamber 13*e*1 of the embodiment of the present disclosure. The first depth h1 of the dummy pressure chamber 13*e*1 is shallower than the fifth depth h5 of the dummy pressure chamber 14*e*1. Therefore, in the vicinity of the diaphragm 50, the portion 11*c* of the partition wall 11 of the dummy pressure chamber 13*e*1 is thicker in the Y-axis direction than the portion 11*c* of the partition wall 11 of the dummy pressure chamber 14*e*1. Hence, the deformation of the partition wall 11 of the dummy pressure chamber 13*e*1 of the present disclosure when receiving tension F1 is curbed compared to the deformation of the partition wall 11 of the dummy pressure chamber 14*e*1 of the comparative example.

By adopting such a mode, the dummy pressure chamber 13 is defined as a shallower recess than the pressure chamber 12. That is, the dummy pressure chamber 13 defines a smaller space than the pressure chamber 12. Therefore, the portion of the pressure chamber substrate 10 defining the dummy pressure chamber 13 has a higher stiffness than the portion defining the pressure chamber 12. Hence, the dummy pressure chamber 13 of the present disclosure is less deformed than the dummy pressure chamber 14e1, which has the same depth h as the pressure chamber 12.

The dummy pressure chamber 13 does not penetrate the pressure chamber substrate 10. The pressure chamber 12 penetrates the pressure chamber substrate 10. Hence, the portion of the pressure chamber substrate 10 defining the dummy pressure chamber 13 has a higher stiffness than the portion defining the pressure chamber 12. Accordingly, unintended deformation of the portion 11c of the partition wall 11 between the dummy pressure chamber 13e1 and the pressure chamber 12e1 is curbed, and the tension difference between the diaphragm 50 on the pressure chamber 12e1 adjacent to the dummy pressure chamber 14e1 and the diaphragm 50 on the pressure chamber 12e2 not adjacent to the dummy pressure chamber 14e1 is reduced. Therefore, when the piezoelectric element 300 corresponding to the pressure chamber 12e1 and the piezoelectric element 300 corresponding to the pressure chamber 12e2 are driven equally, the difference in ejection characteristics is curbed.

The first depth h1 of the dummy pressure chamber 13 is shallower than the second depth h2 of the pressure chamber 12. Therefore, there is a large difference in the stiffness of the dummy pressure chamber 13 as compared to that of the pressure chamber 12 when the depth h is less than half, and the stiffness of the dummy pressure chamber 13 is higher than that of the pressure chamber 12. Hence, the dummy pressure chamber 13 prevents deformation by the adjacent pressure chamber 12.

In addition, the dummy pressure chamber 13 includes the dummy piezoelectric element 300a. That is, the dummy pressure chamber 13 and the pressure chamber 12 are configured of the same laminated structure on the pressure chamber substrate 10. Hence, the pressure chamber substrate 10 has less difference in stiffness and change in film stress on the pressure chamber substrate 10 compared to when the dummy piezoelectric element 300a is not provided.

Furthermore, the dummy pressure chamber 13 is arranged adjacent to the active region 50r1. Hence, the dummy pressure chamber 13 can curb deformation of a region that causes pressure fluctuations in the pressure chamber 12.

The plurality of pressure chambers 12 and one or more dummy pressure chambers 13 are arranged with equal spacing. More specifically, the distance between the pressure chambers 12, between the dummy pressure chambers 13, and between the pressure chamber 12 and the dummy pressure chamber 13 are equal. Hence, by bringing the conditions of the dummy pressure chamber 13 and the pressure chamber 12 closer together, the difference between the stiffness of the pressure chamber 12 and the dummy pressure chamber 13 is reduced in the pressure chamber substrate 10.

Accordingly, the dummy pressure chamber 13 of the present disclosure can curb variation in pressure loss among the pressure chambers by preventing changes in the volume of the pressure chamber 12 due to deformation when it is not driven. That is, liquid ejection characteristics are improved for the liquid ejecting head 510.

Furthermore, the difference between the fourth depth h4 of the dummy pressure chamber 13 and the third depth h3 of the pressure chamber 12 at the second position P2 of the inactive region 50r2 is smaller than the difference between the first depth h1 of the dummy pressure chamber 13 and the second depth h2 of the pressure chamber 12 at the first position P1 of the active region 50r1. By adopting such a mode, the difference between the third depth h3 of the pressure chamber 12 and the fourth depth h4 of the dummy pressure chamber 13 at the second position P2 becomes relatively small. Here, at the second position P2, which is the inactive region 50r2, the diaphragm 50 is not deformed because the stepped portion 10s of the pressure chamber substrate 10 is provided. Hence, the tension of the diaphragm 50 is not a problem as in the first position P1, which is the active region 50r1. On the other hand, at the second position P2, there is a problem of so-called crosstalk where unintended deformation of the pressure chamber substrate that divides the pressure chambers 12 from each other or the dummy pressure chamber 13 from the pressure chamber 12, affecting the adjacent pressure chambers 12. Such deformations are caused by the internal pressure in the pressure chamber 12 from driving the piezoelectric element 300. Accordingly, by reducing the difference between the third depth h3 of the pressure chamber 12 and the fourth depth h4 of the dummy pressure chamber 13, or more preferably, by making the third depth h3 and the fourth depth h4 substantially equal, it is possible to reduce the difference in the effect of the aforementioned crosstalk between the pressure chamber 12e1 of the end portion and the pressure chamber 12e2 or the like, which is the pressure chamber 12 other than that of the end portion. Hence, the variation in the amount of ink ejected by the pressure chamber 12 of the end portion and the pressure chamber 12 of the non-end portion can be curbed.

Of both ends of the pressure chamber 12, deformation of the pressure chamber 12 at the second position P2 is prevented at one end portion near the nozzle 21. Since the variation of pressure loss is reduced at a position closer to the nozzle 21, liquid ejection characteristics are improved compared to when deformation of the end portion far from the nozzle 21 is prevented.

In addition, the second position P2 is the region of the diaphragm 50 that is not driven by the piezoelectric element 300, or the region where a portion of the pressure chamber substrate 10 overlaps and is not subjected to pressure in the pressure chamber 12. Hence, in a region where no pressure is applied, the stiffness of the pressure chamber 12 approaches that of the adjacent dummy pressure chamber 13.

Accordingly, the pressure chamber 12 of the present disclosure prevents deformation at the second position P2, thereby preventing variation in the pressure loss among the pressure chambers 12.

Furthermore, by adopting such a mode, the silicon oxide film diaphragm 50 can function as an etch stop layer when the pressure chamber 12 is formed by anisotropically etching the silicon crystal pressure chamber substrate 10. That is, the silicon oxide film diaphragm 50 facilitates anisotropic etching to form a recess up to the diaphragm 50.

Figure 14:
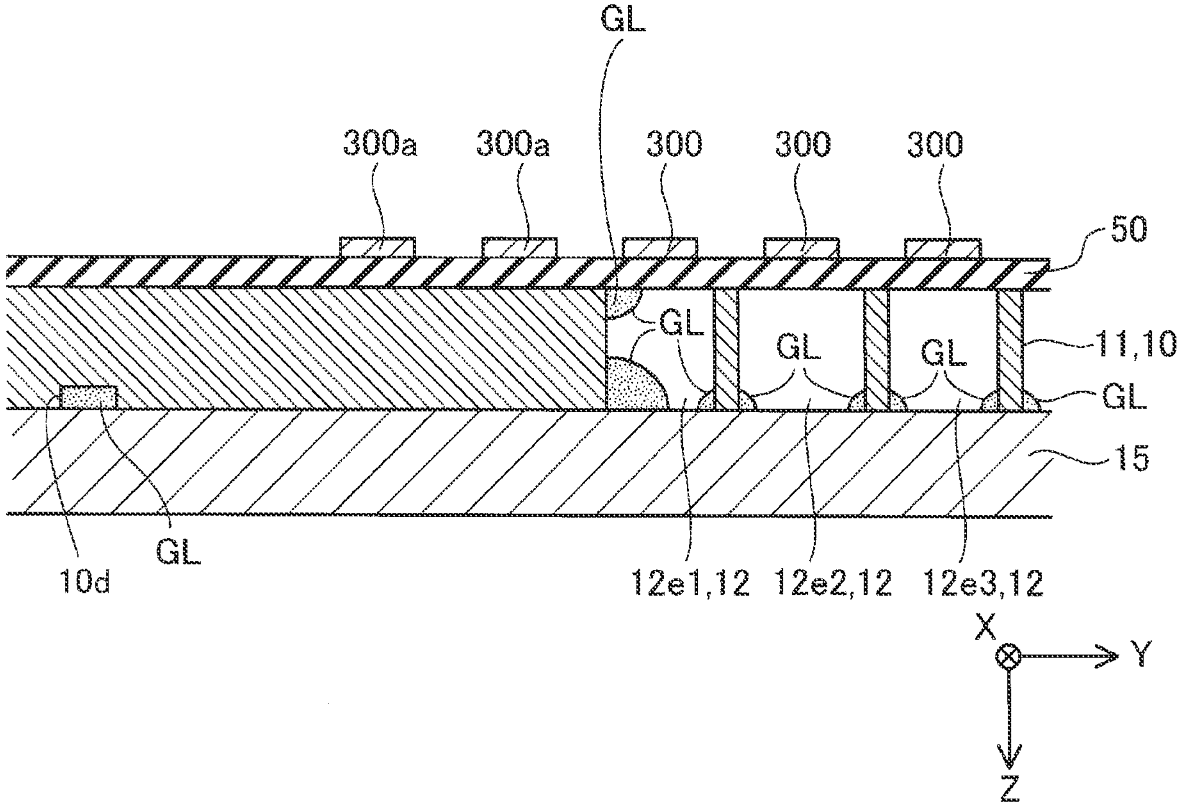
FIG. 14 is an explanatory drawing illustrating the state of adhesion of the coupling plate and the pressure chamber substrate.

FIG. 14 is an explanatory drawing illustrating the state of adhesion of the coupling plate 15 and the pressure chamber substrate 10. FIG. 14 shows FIG. 10 without the dummy pressure chamber 13. Furthermore, FIG. 14 illustrates a portion GL of adhesive that bonds the coupling plate 15 to the pressure chamber substrate 10. The adhesive is applied between the coupling plate 15 and the pressure chamber substrate 10. The adhesive overflows between the coupling plate 15 and the pressure chamber substrate 10 during bonding. The overflowing portion GL of adhesive flows into the pressure chamber 12, which is a recess. The pressure chamber 12e1 at the end portion is in contact with the partition wall 11 which has a wide adhesive surface, so that more portions GL of adhesive flow in than into the other pressure chambers 12. Furthermore, the portion GL of adhesive may flow in the −Z direction up to the diaphragm 50. The portion GL of adhesive may change the volume of the pressure chamber 12 or curb the vibration of the diaphragm 50. The pressure chamber 12*e*1 at the end portion is more likely to be affected by the portion GL of adhesive than the other pressure chambers 12 because of the large inflow of portion GL of adhesive. Thus, the portion GL of adhesive causes variation in the pressure loss of a plurality of pressure chambers 12.

When the dummy pressure chamber 13 is present, the portion GL of adhesive also flows into the dummy pressure chamber 13. Therefore, by providing the dummy pressure chamber 13 adjacent to the end portion pressure chamber 12*e*1, the variation in pressure loss of the plurality of pressure chambers 12 due to the portion GL of adhesive is reduced.

Furthermore, the plurality of pressure chambers 12 and one or more dummy pressure chambers 13 are equally spaced. That is, each of the plurality of pressure chambers 12 has an adjacent recess. Therefore, the dummy pressure chamber 13 prevents unbalance in the amount of portion GL of adhesive flowing in due to the position of the center or end portion in the plurality of pressure chambers 12. Hence, the variation in pressure loss among the plurality of pressure chambers 12 is reduced.

By adopting such a mode, the dimple 10*d* is provided in the pressure chamber substrate 10 as a recess that is different from the dummy pressure chamber 13. For example, when applying an adhesive to the pressure chamber substrate 10 to form a laminate structure, the dimple 10*d* becomes a recess on the pressure chamber substrate to facilitate application of the adhesive.

B. Modification

In the above embodiment, the liquid ejecting head 510 includes the first pressure chamber row La and the second pressure chamber row Lb and the nozzle 21 for each channel. Ink ejection is performed in each pressure chamber row of the first pressure chamber row La and the second pressure chamber row Lb. That is, ink supplied from the first pressure chamber row La does not reach the pressure chamber 12 of the second pressure chamber row Lb. However, the liquid ejecting head 510 may have a structure in which the first pressure chamber row La and the second pressure chamber row Lb and their respective channels are coupled. This structure is also referred to as the DCR structure. That is, ink supplied from the first pressure chamber row La reaches the pressure chamber 12 of the second pressure chamber row Lb. The nozzle 21 is located between the channels coupling the pressure chamber 12 of the first pressure chamber row La and the pressure chamber 12 of the second pressure chamber row Lb. Even in the DCR structure, as in the above embodiment, the dummy pressure chamber 13 is provided adjacent to the pressure chamber 12 to which pressure is applied, so that variation in pressure loss among the pressure chambers 12 is prevented.

C. Modification

1. In the above embodiment, the active region 50*r*1 of the pressure chamber 12*e*1 of the end portion is configured such that the range of the channel direction Am30 is included in the dummy pressure chamber 13 when viewed along the arrangement direction Am20. That is, the length L1 is a length that is greater than or equal to the length L2 and includes the range of the length L2. However, the length L1 may be less than the length L2. For example, the length L1 may be half the length L2 of the active region 50*r*1. The dummy pressure chamber 13 may be provided adjacent to the center of the diaphragm 50 in the active region 50*r*1, where the displacement of the diaphragm 50 is large when the piezoelectric element 300 is driven.

2. In the above embodiment, the plurality of pressure chambers 12 and one or more dummy pressure chambers 13 are arranged in the arrangement direction Am20 and equally spaced. However, when, for example, the portion 11*c* of the partition wall 11 of the dummy pressure chamber 13*e*1 is deformed, the spacing T3 between the pressure chamber 12*e*1 and the dummy pressure chamber 13*e*1 may be adjusted experimentally based on the amount of displacement.

3. In the above embodiment, the plurality of pressure chambers 12 are defined by the pressure chamber substrate 10 and the diaphragm 50, and one or more dummy pressure chambers 13 are defined by the pressure chamber substrate 10 and not by the diaphragm 50. However, one or more dummy pressure chambers 13 may be defined by the diaphragm 50. More specifically, the depth h of the dummy pressure chamber 13 may be defined by the diaphragm 50 by providing a protrusion protruding on a surface of the diaphragm 50 that faces the dummy pressure chamber 13.

4. In the above embodiment, the pressure chamber substrate 10 may be formed using a glass substrate, an SOI substrate, various ceramic substrates, or the like.

5. In the above embodiment, the diaphragm 50 may, for example, be made of any one of the elastic film 55 and the insulator film 56. Furthermore, films other than the elastic film 55 and the insulator film 56 may be included. Other film materials include silicon and silicon nitride.

6. In the above embodiment, the dummy piezoelectric element 300*a* is electrically coupled with the relay substrate 120. However, the dummy piezoelectric element 300*a* does not have to be electrically coupled with the relay substrate 120. That is, the first electrode 60 and the individual lead electrode 91, and the second electrode 80 and the common lead electrode 92 need not be coupled electrically. The dummy piezoelectric element 300*a* need not be driven and need not be electrically coupled with the relay substrate 120, or may be driven or not driven while being electrically coupled with the relay substrate 120.

7. In the above embodiment, the first depth h1 is half of the second depth h2. However, for example, the first depth h1 only needs to be greater than the depth hd of the dimple 10*d* and less than the second depth h2.

8. In the above embodiment, the pressure chamber 12 has the inactive region 50*r*2. However, the pressure chamber 12 need not have the inactive region 50*r*2, and may include only the active region 50*r*1. That is, the depth h of pressure chamber 12 may be formed only by the second depth h2.

9. In the above embodiment, the pressure chamber substrate 10 includes the dimple 10*d*. However, the pressure chamber substrate 10 does not necessarily have to include the dimple 10D.

10. In the above embodiment, one or more dummy pressure chambers 13 are not coupled to the manifold 100 and the nozzle 21. However, one or more dummy pressure chambers 13 may be coupled to the manifold 100 and the nozzle 21. It is sufficient that one or more dummy pressure chambers 13 are not coupled to the nozzle 21.

D. Other Embodiments

The present disclosure is not limited to the embodiments described above, but can be implemented in various modes within the scope of the gist of the disclosure. For example, the present disclosure can also be implemented by the following modes. The technological features in the above embodiments corresponding to the technological features in each of the modes described below can be replaced or combined as appropriate to solve some or all of the issues of the present disclosure, or to achieve some or all of the effects of the present disclosure. If the technological feature is not described as essential in the specification, it can be deleted as appropriate.

1. According to an aspect of the present disclosure, a liquid ejecting head is provided. The liquid ejecting head includes a laminated body including a plurality of piezoelectric elements, a diaphragm that vibrates by being driven by each of the plurality of piezoelectric elements, and a pressure chamber substrate having a plurality of pressure chambers coupled to a nozzle and contributing to ejection of a liquid by applying pressure to the liquid through vibration of the diaphragm, and one or more dummy pressure chambers not contributing to ejection of the liquid are laminated. In the laminated body, each of the plurality of pressure chambers and each of the one or more dummy pressure chambers open on a surface opposite to a surface facing the diaphragm of the pressure chamber substrate, and are a recess having a depth in a direction toward the diaphragm in the lamination direction. The plurality of pressure chambers and the one or more dummy pressure chambers are arranged in an arrangement direction perpendicular to the lamination direction. A first depth as the depth of the dummy pressure chamber is shallower than a second depth as the depth of the pressure chamber. By adopting such a mode, the dummy pressure chamber is defined as a recess shallower than the pressure chamber. That is, the dummy pressure chamber defines a smaller space than the pressure chamber. Therefore, a portion of the pressure chamber substrate defining the dummy pressure chamber has higher stiffness than a portion defining the pressure chamber. Hence, the dummy pressure chamber deforms less than a mode such as the dummy pressure chamber having the same depth as the pressure chamber. Accordingly, for example, when arranged adjacent to the pressure chamber, the dummy pressure chamber can curb variation in pressure loss among the pressure chambers by preventing changes in the volume of the pressure chamber due to deformation when it is not driven. That is, liquid ejection characteristics are improved for the liquid ejecting head.

2. In the above aspect, the piezoelectric element may include a first electrode, a piezoelectric layer, and a second electrode, and when a region in which the pressure chamber, the diaphragm, the first electrode, the piezoelectric layer, and the second electrode overlap when viewed in the lamination direction is defined as an active region, and a direction intersecting the lamination direction and the arrangement direction is defined as a channel direction, a range of the active region is included in a range of the dummy pressure chamber in the channel direction when viewed in the arrangement direction, and a length of the range of the dummy pressure chamber in the channel direction may be equal to or longer than a length of the range of the active region in the channel direction. By adopting such a mode, the dummy pressure chamber is arranged adjacent to the active region. Hence, the dummy pressure chamber can curb deformation of a region that causes pressure fluctuation in the pressure chamber.

3. In the above aspect, the plurality of pressure chambers and the one or more dummy pressure chambers may be equally spaced in the arrangement direction. By adopting such a mode, the plurality of pressure chambers and the one or more dummy pressure chambers are arranged with equal spacing. More specifically, the distance between the pressure chambers, between the dummy pressure chambers, and between the pressure chamber and the dummy pressure chamber are equal. Hence, by bringing the conditions of the dummy pressure chamber and the pressure chamber closer together, the difference between the stiffness of the pressure chamber and the dummy pressure chamber is reduced in the pressure chamber substrate.

4. In the above aspect, the plurality of pressure chambers may be defined by the pressure chamber substrate and the diaphragm, and the one or more dummy pressure chambers may be defined by the pressure chamber substrate but not defined by the diaphragm. By adopting such a mode, the dummy pressure chamber does not penetrate the pressure chamber substrate. The pressure chamber penetrates the pressure chamber substrate. Hence, the portion of the pressure chamber substrate defining the dummy pressure chamber has a higher stiffness than the portion defining the pressure chamber.

5. In the above aspect, the pressure chamber substrate may include silicon crystals, and the diaphragm may include a silicon oxide film. By adopting such a mode, the silicon oxide film diaphragm can function as an etch stop layer when the pressure chamber is formed by anisotropically etching the silicon crystal pressure chamber substrate. That is, the silicon oxide film diaphragm facilitates anisotropic etching to form a recess up to the diaphragm.

6. In the above aspect, the liquid ejecting head may further include one or more dummy piezoelectric elements having the same configuration as the piezoelectric element but is not driven, and each of the one or more dummy piezoelectric elements may be overlap with the dummy pressure chamber when viewed in the lamination direction. By adopting such a mode, the dummy pressure chamber includes the dummy piezoelectric element. That is, the dummy pressure chamber and the pressure chamber are configured of the same laminated structure on the pressure chamber substrate. Hence, the pressure chamber substrate has less difference in stiffness and change in film stress on the pressure chamber substrate compared to when the dummy piezoelectric element is not provided.

7. In the above aspect, the first depth may be half or more of the second depth. By adopting such a mode, the first depth of the dummy pressure chamber is shallower than the second depth of the pressure chamber. Therefore, there is a small difference between the stiffness of the dummy pressure chamber and the stiffness of the pressure chamber as compared to when the depth is less than half, and the stiffness of the dummy pressure chamber is higher than that of the pressure chamber. Hence, the dummy pressure chamber prevents deformation by the adjacent pressure chamber.

8. In the above aspect, the piezoelectric element further includes a first electrode, a piezoelectric layer, and a second electrode, when a region in which the pressure chamber, the diaphragm, the first electrode, the piezoelectric layer, and the second electrode overlap is defined as an active region when viewed in the lamination direction, a position of the active region in a channel direction intersecting the lamination direction and the arrangement direction is defined as a first position, a position other than the active region and closer to the end portion of the pressure chamber than the first position in the channel direction is defined as a second position, the depth of the pressure chamber in the second position is defined as a third depth, the depth of the dummy pressure chamber in the second position is defined as a fourth depth, and the first depth and the second depth may be the depth in the first position, a difference between the fourth depth and the third depth may be smaller than a difference between the first depth and the second depth. By adopting such a mode, the difference between the third depth of the pressure chamber and the fourth depth of the dummy pressure chamber at the second position becomes relatively small. Here, at the second position, which is the inactive region, the diaphragm is not deformed because the stepped portion of the pressure chamber substrate is provided. Hence, the tension of the diaphragm is not a problem. On the other hand, there is a problem of so-called crosstalk where unintended deformation of the pressure chamber substrate that divides the pressure chambers from each other or the dummy pressure chamber from the pressure chamber. Accordingly, by reducing the difference between the third depth of the pressure chamber and the fourth depth of the dummy pressure chamber, or more preferably, by making the third depth and the fourth depth substantially equal, it is possible to reduce the difference in the effect of the crosstalk between the pressure chamber of the end portion and the pressure chamber other than that of the end portion. Hence, the variation in the amount of ink ejected by the pressure chamber of the end portion and the pressure chamber of the non-end portion can be curbed.

9. In the above aspect, the second position may be closer to the nozzle than the first position in the channel direction. By adopting such a mode, of both ends of the pressure chamber, deformation of the pressure chamber is prevented at one end portion near the nozzle. Since the variation of pressure loss is reduced at a position closer to the nozzle, liquid ejection characteristics are improved compared to when deformation of the end portion far from the nozzle is prevented.

10. In the above aspect, the second position may be a position where the pressure chamber and the diaphragm overlap when viewed in the lamination direction, and may be a position where at least one of the first electrode, the piezoelectric layer, and the second electrode does not overlap, or the first electrode, the piezoelectric layer, the second electrode, and a portion of the pressure chamber substrate overlap. By adopting such a mode, the second position is the region of the diaphragm that is not driven by the piezoelectric element, or the region where a portion of the pressure chamber substrate overlaps and is not subjected to pressure in the pressure chamber. Hence, in a region where no pressure is applied, the stiffness of the pressure chamber approaches that of the adjacent dummy pressure chamber.

11. In the above aspect, the pressure chamber substrate may include a dimple that opens on a surface opposite to a surface facing the diaphragm of the pressure chamber substrate and serves as a recess having a depth toward the diaphragm in the lamination direction, the dummy pressure chamber may be arranged between the dimple and the pressure chamber in the arrangement direction, and a depth of the dimple may be shallower than the first depth. By adopting such a mode, the dimple is provided in the pressure chamber substrate as a recess that is different from the dummy pressure chamber. For example, when applying an adhesive to the pressure chamber substrate to form a laminate structure, the dimple becomes a recess on the pressure chamber substrate to facilitate application of the adhesive.

What is claimed is:

1. A liquid ejecting head comprising:

a piezoelectric element;

a diaphragm that vibrates by being driven by the piezoelectric element; and a pressure chamber substrate that has a pressure chamber coupled to a nozzle and contributing to ejection of a liquid by applying pressure on the liquid through vibration of the diaphragm, and a dummy pressure chamber not contributing to ejection of the liquid, wherein the pressure chamber substrate, the diaphragm and the piezoelectric element are laminated in this order in a lamination direction, each of the pressure chamber and the dummy pressure chamber opens on a second surface opposite to a first surface facing the diaphragm of the pressure chamber substrate, and is a recess having a depth in a direction toward the diaphragm along the lamination direction;

the pressure chamber and the dummy pressure chamber are arranged in an arrangement direction perpendicular to the lamination direction; and a first depth as the depth of the dummy pressure chamber is shallower than a second depth as the depth of the pressure chamber.

2. The liquid ejecting head according to claim 1, wherein the piezoelectric element includes a first electrode, a piezoelectric layer, and a second electrode, when a region in which the pressure chamber, the diaphragm, the first electrode, the piezoelectric layer, and the second electrode overlap when viewed in the lamination direction is defined as an active region, and a direction intersecting the lamination direction and the arrangement direction is defined as a channel direction, and a range of the active region is included in a range of the dummy pressure chamber in the channel direction when viewed in the arrangement direction, and a length of the range of the dummy pressure chamber in the channel direction is equal to or longer than a length of the range of the active region in the channel direction.

3. The liquid ejecting head according to claim 1, wherein the pressure chamber substrate has a plurality of pressure chambers including the pressure chamber, wherein the plurality of pressure chambers and the dummy pressure chamber are equally spaced in the arrangement direction.

4. The liquid ejecting head according to claim 1, wherein the pressure chamber is defined by the pressure chamber substrate and the diaphragm, and the dummy pressure chamber is defined by the pressure chamber substrate but not defined by the diaphragm.

5. The liquid ejecting head according to claim 4, wherein the pressure chamber substrate include silicon crystals, and the diaphragm includes a silicon oxide film.

6. The liquid ejecting head according to claim 4, further comprising a dummy piezoelectric element having the same configuration as the piezoelectric element, wherein the dummy piezoelectric element overlaps the dummy pressure chamber when viewed in the lamination direction.

7. The liquid ejecting head according to claim 1, wherein the first depth is half or more of the second depth.

8. The liquid ejecting head according to claim 1, wherein the piezoelectric element includes a first electrode, a piezoelectric layer, and a second electrode;

when a region in which the pressure chamber, the diaphragm, the first electrode, the piezoelectric layer, and the second electrode overlap when viewed in the lamination direction is defined as an active region, a position of the active region in a channel direction intersecting the lamination direction and the arrangement direction is defined as a first position, a position other than the active region and closer to the end portion of the pressure chamber than the first position in the channel direction is defined as a second position, the depth of the pressure chamber in the second position is defined as a third depth, the depth of the dummy pressure chamber in the second position is defined as a fourth depth, and the first depth and the second depth are the depth in the first position, a difference between the fourth depth and the third depth is smaller than a difference between the first depth and the second depth.

9. The liquid ejecting head according to claim 8, wherein the second position is closer to the nozzle than the first position in the channel direction.

10. The liquid ejecting head according to claim 8, wherein the second position is a position where the pressure chamber and the diaphragm overlap when viewed in the lamination direction, and the second position is a position where at least one of the first electrode, the piezoelectric layer, and the second electrode does not overlap when viewed in the lamination direction, or a position where the first electrode, the piezoelectric layer, the second electrode, and a portion of the pressure chamber substrate overlap when viewed in the lamination direction.

11. The liquid ejecting head according to claim 1, wherein the pressure chamber substrate includes a dimple that opens on the second surface and serves as a recess having a depth toward the diaphragm in the lamination direction;

the dummy pressure chamber is arranged between the dimple and the pressure chamber in the arrangement direction; and a depth of the dimple is shallower than the first depth.

12. The liquid ejecting head according to claim 1, wherein the pressure chamber substrate has a second dummy pressure chamber different from the dummy pressure chamber, wherein the pressure chamber, the dummy pressure chamber, and the second pressure chamber are spaced equally in the arrangement direction.

* * * * *